US012237507B2

(12) United States Patent
Yamauchi et al.

(10) Patent No.: US 12,237,507 B2
(45) Date of Patent: Feb. 25, 2025

(54) NICKEL COMPOSITE HYDROXIDE, METHOD FOR PRODUCING NICKEL COMPOSITE HYDROXIDE, POSITIVE ELECTRODE ACTIVE MATERIAL FOR LITHIUM ION SECONDARY BATTERY, METHOD FOR PRODUCING POSITIVE ELECTRODE ACTIVE MATERIAL FOR LITHIUM ION SECONDARY BATTERY, AND LITHIUM ION SECONDARY BATTERY

(71) Applicant: SUMITOMO METAL MINING CO., LTD., Tokyo (JP)

(72) Inventors: Mitsuru Yamauchi, Tokyo (JP); Tai Ito, Ehime (JP); Tetsufumi Komukai, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 591 days.

(21) Appl. No.: 17/606,663

(22) PCT Filed: Apr. 24, 2020

(86) PCT No.: PCT/JP2020/017859
§ 371 (c)(1),
(2) Date: Oct. 26, 2021

(87) PCT Pub. No.: WO2020/218592
PCT Pub. Date: Oct. 29, 2020

(65) Prior Publication Data
US 2022/0158185 A1    May 19, 2022

(30) Foreign Application Priority Data
Apr. 26, 2019 (JP) .................... 2019-086217
Apr. 26, 2019 (JP) .................... 2019-086218

(51) Int. Cl.
*H01M 4/525* (2010.01)
*C01G 53/04* (2006.01)
*H01M 4/02* (2006.01)
*H01M 4/04* (2006.01)
*H01M 4/36* (2006.01)
*H01M 4/505* (2010.01)
*H01M 10/0525* (2010.01)

(52) U.S. Cl.
CPC ............ *H01M 4/525* (2013.01); *C01G 53/04* (2013.01); *H01M 4/0471* (2013.01); *H01M 4/366* (2013.01); *H01M 4/505* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| 11,735,726 | B2 * | 8/2023 | Kaneda | C01G 53/42 |
| | | | | 429/223 |
| 2002/0192552 | A1 * | 12/2002 | Lampe-Onnerud | |
| | | | | H01M 4/1391 |
| | | | | 429/231.9 |
| 2014/0087263 | A1 * | 3/2014 | Matsumoto | C01G 45/1228 |
| | | | | 429/223 |
| 2017/0133677 | A1 * | 5/2017 | Ryoshi | H01M 4/525 |
| 2017/0155144 | A1 * | 6/2017 | Yamauchi | C01G 53/40 |
| 2017/0271653 | A1 * | 9/2017 | Yamauchi | H01M 4/525 |
| 2018/0013129 | A1 * | 1/2018 | Lee | H01M 4/366 |
| 2018/0190978 | A1 * | 7/2018 | Toma | C01G 53/006 |
| 2019/0379038 | A1 * | 12/2019 | Toma | H01M 4/525 |

FOREIGN PATENT DOCUMENTS

| EP | 3007254 A1 | 4/2016 | |
| JP | 2004-533104 A | 10/2004 | |
| JP | 2011-116580 A | 6/2011 | |
| JP | 2012-256435 A | 12/2012 | |
| JP | 2015-072800 A | 4/2015 | |
| JP | 2017-154916 A | 9/2017 | |
| JP | 2018-506156 A | 3/2018 | |
| JP | 2018070419 A * | 5/2018 | ............ C01G 53/00 |
| JP | 2019019047 A * | 2/2019 | ............ C01G 53/00 |
| WO | WO-2019013053 A1 * | 1/2019 | ............ C01G 53/00 |

OTHER PUBLICATIONS

Jul. 14, 2020 International Search Report issued in International Patent Application No. PCT/JP2020/017859.
Jul. 14, 2020 Written Opinion issued in International Patent Application No. PCT/JP2020/017859.
Jun. 28, 2022 Search Report issued in European Patent Application No. 20794350.7.

* cited by examiner

*Primary Examiner* — Kevin M Bernatz
(74) *Attorney, Agent, or Firm* — Oliff PLC

(57) ABSTRACT

A nickel composite hydroxide includes nickel, cobalt, manganese, and an element M with an atomic ratio of Ni:Co:Mn:M=1−x1−y1−z1:x1:y1:z1 (wherein M is at least one element selected from a group consisting of a transition metal element other than Ni, Co, Mn, a II group element, and a XIII group element, $0.15 \leq x1 \leq 0.25$, $0.15 \leq y1 \leq 0.25$, $0 \leq z1 \leq 0.1$), the nickel composite hydroxide having a cobalt or manganese rich layer from a surface of a particle of the secondary particles toward an inside of the secondary particles and a layered low-density layer between the cobalt or manganese rich layer and a center of the particle of the secondary particles, and a thickness of the cobalt or manganese rich layer and low-density layer is 1% or more and 10% or less to a diameter of the secondary particles.

12 Claims, 1 Drawing Sheet

NICKEL COMPOSITE HYDROXIDE, METHOD FOR PRODUCING NICKEL COMPOSITE HYDROXIDE, POSITIVE ELECTRODE ACTIVE MATERIAL FOR LITHIUM ION SECONDARY BATTERY, METHOD FOR PRODUCING POSITIVE ELECTRODE ACTIVE MATERIAL FOR LITHIUM ION SECONDARY BATTERY, AND LITHIUM ION SECONDARY BATTERY

BACKGROUND OF THE INVENTION

Field of the Invention

The present invention relates to a nickel composite hydroxide, which is a precursor of a positive electrode active material for a lithium ion secondary battery, and a production method thereof, a positive electrode active material for a lithium ion secondary battery, which is having the nickel composite hydroxide as a raw material, and a production method thereof, and a lithium ion secondary battery using the positive electrode active material for the lithium ion secondary battery as a positive electrode material. This application is based upon and claims the benefit of priority from Japanese Patent Application No. 2019-086217 filed on Apr. 26, 2019, and Japanese Patent Application No. 2019-086218 filed on Apr. 26, 2019.

Description of Related Art

In recent years, there is a strong demand for a development of compact and lightweight secondary batteries having a high energy density, due to the widespread use of portable electronic devices such as smart phones and notebook computers.

For a positive electrode material of a lithium ion secondary battery, a lithium composite oxide is used as a positive electrode active material. A lithium cobalt composite oxide is relatively easy to synthesize, and also, in a lithium ion secondary battery using a lithium cobalt composite oxide as a positive electrode material, a 4 V-class high voltage can be obtained, so it is expected as a material for putting the secondary battery having high energy density into practical use. With respect to a lithium cobalt composite oxide, research and development have been promoted for achieving excellent initial capacity property and cycle characteristic in the secondary battery, and various results have been obtained already.

However, a lithium cobalt composite oxide uses a rare and expensive cobalt compound as a raw material, so it is being a cause for an increase in cost of a positive electrode material and a secondary battery. A lithium ion secondary battery using a lithium cobalt composite oxide is having a unit cost per capacity four times higher than which of a nickel hydrogen battery, so its applicable use is limited extremely. Therefore, from a point of view of achieving further weight reduction and miniaturization of mobile devices, it is necessary to be able to produce a lithium ion secondary battery at a lower cost, by reducing a cost of a positive electrode active material.

As a positive electrode active material, which can replace a lithium cobalt composite oxide, for example, a lithium nickel composite oxide ($LiNiO_2$), a lithium nickel cobalt manganese composite oxide ($LiNi_{1/3}Co_{1/3}Mn_{1/3}O_2$) or the like can be cited. A lithium nickel composite oxide is expected as a positive electrode active material enabling a high capacity of a secondary battery, as a problem by an oxidization of an electrolyte solution is hardly caused, because a lithium nickel composite oxide shows an electric potential lower than a lithium cobalt composite oxide, and also, a lithium nickel composite oxide shows a high electric voltage similar to a lithium cobalt composite oxide.

For example, in Patent Literature 1, nuclei having an empirical formula: $Li_xM'_zNi_{1-y}M''_yO_2$, and a composition having a coating with a cobalt/nickel ratio higher than the nuclei, are proposed, and indicated that they are excellent in a safety and a cycle efficiency.

Also, in Patent Literature 2, it is proposed to inhibit a gelation at the time of a production of an electrode by reducing an alkalinity of an active material by having a manganese rich layer at an outer shell.

Also, in Patent Literature 2 and Patent Literature 3, nickel manganese composite hydroxide particles and nickel cobalt manganese composite hydroxide particles, which are a precursor of a positive electrode active material for a non-aqueous electrolyte secondary battery, are proposed, and a high output and a high capacity are realized.

Patent Literature 1: JP 2004-533104 A
Patent Literature 2: JP 2012-256435 A
Patent Literature 3: JP 2011-116580 A

SUMMARY OF THE INVENTION

However, in Patent Literature 1, there is no description about a positive electrode resistance, and also, there is no description about a composition gradient. In Patent Literature 2, a gap is not introduced between a center layer and a manganese rich layer of an outer shell, so a diffusion of elements at the time of firing cannot be inhibited sufficiently, and more improvement of a cycle characteristic is required. Further, it is required that a positive electrode resistance is low as a positive electrode of a secondary battery, and an improvement of an output characteristic is required in a level higher than a conventional positive electrode, or an improvement of a cycle characteristic is required in a level higher than a conventional positive electrode, as a positive electrode of a secondary battery.

Here, considering the above problems, a purpose of the present invention is to provide a nickel composite hydroxide, which is a precursor of a positive electrode active material for a lithium ion secondary battery excellent in a positive electrode resistance, or to provide a nickel composite hydroxide, which is a precursor of a positive electrode active material for a lithium ion secondary battery excellent in a cycle characteristic, and prevents a diffusion of elements in a manganese rich layer. Or a purpose of the present invention is to provide a method for producing the nickel composite hydroxide easily with high productivity. In addition, a purpose of the present invention is to provide a positive electrode active material for a lithium ion secondary battery excellent in a positive electrode resistance, a method for producing the positive electrode active material for the lithium ion secondary battery, and a lithium ion secondary battery.

A nickel composite hydroxide relating to one embodiment of the present invention is a nickel composite hydroxide, which is composed of secondary particles to which plural primary particles are aggregated, wherein the nickel composite hydroxide comprises a nickel, a cobalt, a manganese, and an element M with an atomic ratio of Ni:Co:Mn:M=1−x1−y1−z1:x1:y1:z1 (wherein M is at least one element selected from a group consisting of a transition metal element other than Ni, Co, Mn, a II group element, and a XIII group element, $0.15 \leq x1 \leq 0.25$, $0.15 \leq y1 \leq 0.25$, $0 \leq z1 \leq 0.1$), the nickel composite hydroxide is having a cobalt rich layer or a manganese rich layer from a surface of a particle of the secondary particles toward an inside of the particle of the secondary particles and a layered low-density layer between the cobalt rich layer or the manganese rich layer and a center of the particle of the secondary particles, the cobalt rich layer comprises a nickel, a cobalt, a manganese, and an element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=1 and y2=0 or x2/((1−x2−y2−z2)+y2)≥1, and z2 is within a range of $0 \leq z2 \leq 0.1$), the manganese rich layer comprises a nickel, a cobalt, a manganese, and an element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=0 and y2=1 or y2/((1−x2−y2−z2)+x2)≥1, and z2 is within a range of $0 \leq z2 \leq 0.1$), and a thickness of the cobalt rich layer or the manganese rich layer is 1% or more and 10% or less with respect to a diameter of the secondary particles, and also, a thickness of the low-density layer is 1% or more and 10% or less with respect to the diameter of the secondary particles.

In this way, a nickel composite hydroxide, which is a precursor of a positive electrode active material for a lithium ion secondary battery excellent in a positive electrode resistance or in a cycle characteristic, is provided.

Here, in a particle size distribution measured by a laser diffraction scattering method, a volume average particle size (Mv) is 4 micrometers or more and 10 micrometers or less, and [(D90−D10)/Mv] indicating a particle size distribution width, which is calculated by a cumulative 90 volume % particle size (D90) and a cumulative 10 volume % particle size (D10), and the volume average particle size (Mv), may be 0.60 or less.

In this way, an excellent cycle characteristic or a high output characteristic with less variation is obtained.

Here, one embodiment of the present invention is a method for producing a nickel composite hydroxide, which is composed of secondary particles to which plural primary particles are aggregated, comprising: a nucleation process for performing a nucleation by adjusting a first mixed aqueous solution containing at least one of a nickel salt, a cobalt salt, and a manganese salt such that a pH will be 12.5 or more on the basis of a liquid temperature of 25° C., in a non-oxidizing atmosphere with an oxygen concentration of less than 5 volume %; and a particle growth process for performing a particle growth by adjusting a slurry containing nucleus formed in the nucleation process such that a pH will be in a range of 10.5 or more and 12.5 or less on the basis of a liquid temperature of 25° C., and also, a pH will be lower than the pH in the nucleation process, wherein the particle growth process comprises: a first particle growth process; a second particle growth process; and a third particle growth process for forming a cobalt rich layer or a manganese rich layer from a surface of a particle of the secondary particles toward an inside of the particle of the secondary particles, in the first particle growth process, a center of the particle is formed by supplying the first mixed aqueous solution to a mixed aqueous solution obtained in the nucleation process in a non-oxidizing atmosphere with an oxygen concentration of less than 5 volume %, in the second particle growth process, a layered low-density layer is formed by supplying the first mixed aqueous solution to a mixed aqueous solution obtained in the first particle growth process, and by switching to an oxidizing atmosphere with an oxygen concentration of 5 volume % or more, in the third particle growth process for forming the cobalt rich layer, the cobalt rich layer is formed by supplying a second mixed aqueous solution comprising a nickel, a cobalt, a manganese, and an element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=1 and y2=0 or x2/((1−x2−y2−z2)+y2)≥1, and z2 is within a range of $0 \leq z2 \leq 0.1$) to a mixed aqueous solution obtained in the second particle growth process, and by switching to a non-oxidizing atmosphere with an oxygen concentration of less than 5 volume %, or in the third particle growth process for forming the manganese rich layer, the manganese rich layer is formed by supplying a second mixed aqueous solution comprising a nickel, a cobalt, a manganese, and an element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=0 and y2=1 or y2/((1−x2−y2−z2)+x2)≥1, and z2 is within a range of $0 \leq z2 \leq 0.1$) to a mixed aqueous solution obtained in the second particle growth process, and by switching to a non-oxidizing atmosphere with an oxygen concentration of less than 5 volume %.

In this way, a method for producing a nickel composite hydroxide, which is a precursor of a positive electrode active material for a lithium ion secondary battery excellent in a positive electrode resistance or in a cycle characteristic, easily with high productivity, is provided.

Here, in one embodiment of the present invention, in the particle growth process, an ammonia adjusted to a concentration of 5 g/L or more and 20 g/L or less may be added to the slurry.

In this way, an ammonia functions as a complexing agent, so primary particles will be uniformized by maintaining a solubility of metal ions constantly, and a variation in a particle size of nickel composite hydroxides is prevented. Also, a deviation in a composition of nickel composite hydroxides is prevented.

Here, one embodiment of the present invention is a positive electrode active material for a lithium ion secondary battery composed of a lithium nickel composite oxide having a hexagonal crystal layered structure, which is composed of secondary particles to which plural primary particles are aggregated, wherein the lithium nickel composite oxide comprises a lithium, a nickel, a cobalt, a manganese, and an element M with an atomic ratio of Li:Ni:Co:Mn:M=1+u:1−x1−y1−z1:x1:y1:z1 (wherein −0.05≤u≤0.50, M is at least one element selected from a group consisting of a transition metal element other than Ni, Co, Mn, a II group element, and a XIII group element, 0.15≤x1≤0.25, 0.15≤y1≤0.25, $0 \leq z1 \leq 0.1$), the lithium nickel composite oxide is having a cobalt rich layer or a manganese rich layer from a surface of a particle of the secondary particles toward an inside of the particle of the secondary particles and a layered void layer between the cobalt rich layer or the manganese rich layer and a center of the particle of the secondary particles, the cobalt rich layer comprises a lithium, a nickel, a cobalt, a manganese, and an element M with an atomic ratio of Li:Ni:Co:Mn:M=1+u: 1−x2−y2−z2:x2:y2:z2 (wherein −0.05≤u≤0.50, M is at least one element selected from a group consisting of a transition metal element other than Ni, Co, Mn, a II group element, and a XIII group element, x2 and y2 satisfy x2=1 and y2=0 or x2/((1−x2−y2−z2)+y2)≥1, and z2 is within a range of 0≤z2≤0.1), the manganese rich layer comprises a lithium, a nickel, a cobalt, a manganese, and an element M with an atomic ratio of Li:Ni:Co:Mn:M=1+u: 1−x2−y2−z2:x2:y2:z2 (wherein −0.05≤u≤0.50, M is at least one element selected from a group consisting of a transition metal element other than Ni, Co, Mn, a II group element, and a XIII group element, x2 and y2 satisfy x2=0 and y2=1 or y2/((1−x2−y2−z2)+x2)≥1, and z2 is within a range of 0≤z2≤0.1), a thickness of the cobalt rich layer or the manganese rich layer is 1% or more and 10% or less with respect to a diameter of the secondary particles, and also, a thickness of the void layer is 1% or more and 10% or less with respect to the diameter of the secondary particles, and a crystallite diameter calculated from a peak of (003) face by an X-ray diffraction measurement is 100 nm or more and 150 nm or less.

In this way, a positive electrode active material for a lithium ion secondary battery excellent in a positive electrode resistance or in a cycle characteristic is provided.

Here, in one embodiment of the present invention, in a particle size distribution measured by a laser diffraction scattering method, a volume average particle size (Mv) is 4 micrometers or more and 10 micrometers or less, and [(D90−D10)/Mv] indicating a particle size distribution width, which is calculated by a cumulative 90 volume % particle size (D90) and a cumulative 10 volume % particle size (D10), and the volume average particle size (Mv), may be 0.60 or less.

In this way, an excellent cycle characteristic or a high output characteristic with less variation is obtained.

Here, one embodiment of the preset invention is a method for producing a positive electrode active material for a lithium ion secondary battery composed of a lithium nickel composite oxide having a hexagonal crystal layered structure, which is composed of secondary particles to which plural primary particles are aggregated, comprising: a lithium mixing process for forming a lithium mixture by mixing a nickel composite hydroxide and a lithium compound; and a firing process for firing the lithium mixture in an oxidizing atmosphere at a temperature of 800° C. or more and 950° C. or less, wherein the nickel composite hydroxide comprises a nickel, a cobalt, a manganese, and an element M with an atomic ratio of Ni:Co:Mn:M=1−x1−y1−z1:x1:y1:z1 (wherein M is at least one element selected from a group consisting of a transition metal element other than Ni, Co, Mn, a II group element, and a XIII group element, 0.15≤x1≤0.25, 0.15≤y1≤0.25, 0≤z1≤0.1), the nickel composite hydroxide is having a cobalt rich layer or a manganese rich layer from a surface of a particle of the secondary particles toward an inside of the particle of the secondary particles and a layered low-density layer between the cobalt rich layer or the manganese rich layer and a center of the particle of the secondary particles, the cobalt rich layer comprises a nickel, a cobalt, a manganese, and an element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=1 and y2=0 or x2/((1−x2−y2−z2)+y2)≥1, and z2 is within a range of 0≤z2≤0.1), the manganese rich layer comprises a nickel, a cobalt, a manganese, and an element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=0 and y2=1 or y2/((1−x2−y2−z2)+x2)≥1, and z2 is within a range of 0≤z2≤0.1), and a thickness of the cobalt rich layer or the manganese rich layer is 1% or more and 10% or less with respect to a diameter of the secondary particles, and also, a thickness of the low-density layer is 1% or more and 10% or less with respect to the diameter of the secondary particles.

In this way, a method for producing a positive electrode active material for a lithium ion secondary battery excellent in a positive electrode resistance or in a cycle characteristic, is provided.

Here, in other embodiment of the present invention, it may be a lithium ion secondary battery comprising a positive electrode including the positive electrode active material for the lithium ion secondary battery.

In this way, a lithium ion secondary battery comprising a positive electrode including a positive electrode active material for a lithium ion secondary battery excellent in a positive electrode resistance or in a cycle characteristic is provided.

According to the present invention, a nickel composite hydroxide, which is a precursor of a positive electrode active material for a lithium ion secondary battery excellent in a positive electrode resistance or in a cycle characteristic, is provided. In addition, a method for producing the nickel composite hydroxide easily with high productivity is provided. In addition, a positive electrode active material for a lithium ion secondary battery excellent in a positive electrode resistance or in a cycle characteristic and a method for producing the positive electrode active material for the lithium ion secondary battery, and a lithium ion secondary battery are provided.

DETAILED DESCRIPTION OF THE INVENTION

Figure 1:
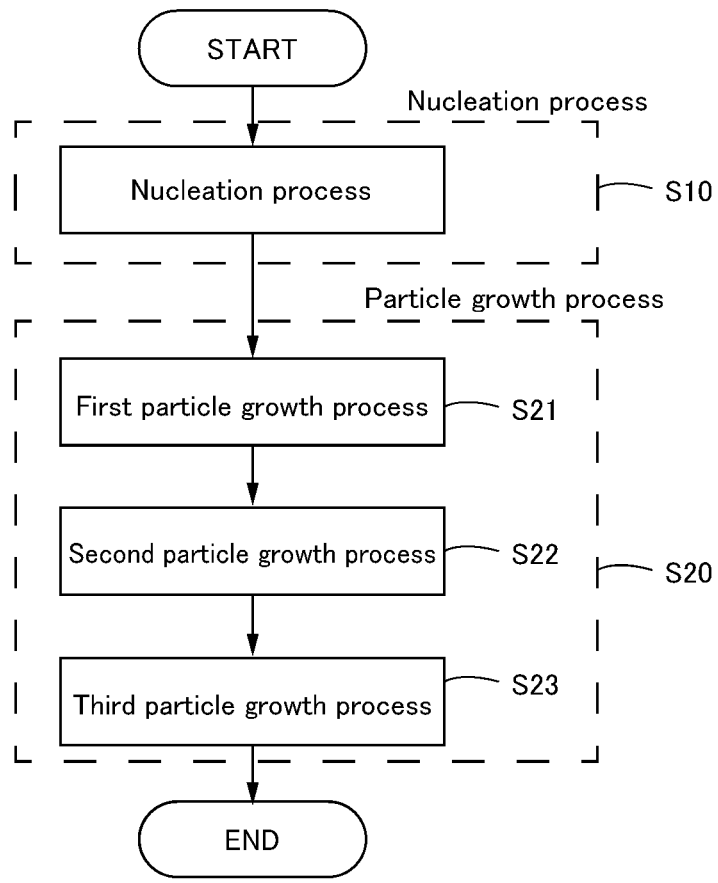
FIG. 1 is a flow chart illustrating an outline of a method for producing a nickel composite hydroxide relating to one embodiment of the present invention.
Figure 2:
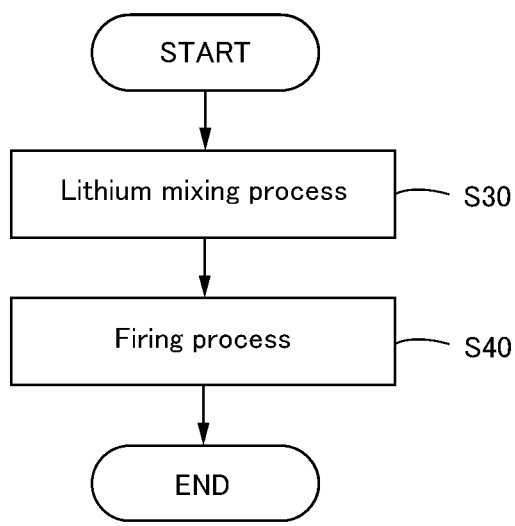
FIG. 2 is a flow chart illustrating an outline of a method for producing a positive electrode active material for a lithium ion secondary battery relating to one embodiment of the present invention.

By a keen examination about a positive electrode active material for a lithium ion secondary battery excellent in a positive electrode resistance for solving the above problem, the inventors have found that a positive electrode resistance will be excellent by configuring a positive electrode active material as a gradient composition in which a cobalt content near a surface of the positive electrode active material is higher than a cobalt content at inside of the positive electrode active material, and also, by introducing a layered void layer between a cobalt rich layer and a center of a particle of the positive electrode active material. In addition, by a keen examination about a positive electrode active material for a lithium ion secondary battery excellent in a cycle characteristic, the inventors have found that a cycle characteristic will be excellent by configuring a positive electrode active material as a gradient composition in which a manganese content near a surface of the positive electrode active material is higher than a manganese content at inside of the positive electrode active material, and also, by introducing a layered void layer between a manganese rich layer and a center of a particle of the positive electrode active material. Further, the inventors have found that a positive electrode active material with a gradient composition is obtained without limiting a firing temperature as a diffusion of a composition at inside of the particle at the time of firing will be inhibited by introducing a void layer between layers with different compositions, and completed the present invention. Hereinafter explaining about preferred embodiments of the present invention.

In addition, following explained embodiments do not unjustly limit a content of the present invention described in claims, and modifications are possible within a scope that does not depart from a gist of the present invention. Also, not all of configurations explained in the present embodiments are necessary as a means for solving the problem of the present invention. Explaining about a nickel composite hydroxide relating to one embodiment of the present invention, and else, in a following order.

1. Nickel composite hydroxide
2. Method for producing nickel composite hydroxide
3. Positive electrode active material for lithium ion secondary battery
4. Method for producing positive electrode active material for lithium ion secondary battery
5. Lithium ion secondary battery <1. Nickel Composite Hydroxide>

A nickel composite hydroxide relating to one embodiment of the present invention is composed of secondary particles to which plural primary particles are aggregated, and having a cobalt rich layer from a surface of a particle of the secondary particles toward an inside of the particle of the secondary particles and a layered low-density layer between the cobalt rich layer and a center of the particle of the secondary particles. Also, a nickel composite hydroxide relating to one embodiment of the present invention is composed of secondary particles to which plural primary particles are aggregated, and having a manganese rich layer from a surface of a particle of the secondary particles toward an inside of the particle of the secondary particles and a layered low-density layer between the manganese rich layer and a center of the particle of the secondary particles. Hereinafter, explaining in detail.

(Composition)

A composition of a nickel composite hydroxide (entire secondary particle) is represented by an atomic ratio of a nickel, a cobalt, a manganese, and an element M as Ni:Co:Mn:M=$1-x1-y1-z1$:$x1$:$y1$:$z1$ (wherein M is at least one element selected from a group consisting of a transition metal element other than Ni, Co, Mn, a II group element, and a XIII group element, $0.15 \leq x1 \leq 0.25$, $0.15 \leq y1 \leq 0.25$, $0 \leq z1 \leq 0.1$). In addition, it may be $0.3 \leq x1+y1+z1 \leq 0.5$.

A nickel content is indicated by $1-x1-y1-z1$, and its range is $0.50 \leq 1-x1-y1-z1 \leq 0.70$. It is having a crystal structure of a layered rock salt structure, and when a nickel content is within the above range, a lithium metal composite oxide obtained finally achieves a high battery capacity when used as a secondary battery.

In the above general formula, x1 indicating a nickel content is $0.15 \leq x1 \leq 0.25$. When a nickel content is within the above range, a lithium metal composite oxide obtained finally is having a high stability of a crystal structure, and more excellent in a cycle characteristic.

In the above general formula, y1 indicating a manganese content is $0.15 \leq y1 \leq 0.25$. When a manganese content is within the above range, a lithium metal composite oxide obtained finally can obtain a high thermal stability.

In addition, a nickel composite hydroxide relating to one embodiment of the present invention may comprise an additive element M other than a nickel, a cobalt, and a manganese, if it is not having an influence on an effect of the present invention. For example, it may comprise a transition metal element other than Ni, Co, Mn, a II group element, or a XIII group element. M(z1) is $0 \leq z1 \leq 0.1$.

A composition distribution at inside of a particle of a nickel composite hydroxide is having a strong influence on a composition distribution at inside of a particle of a positive electrode active material obtained by using this nickel composite hydroxide. Especially, as described in below, a particle size distribution and a composition distribution at inside of the particle of the nickel composite hydroxide can be maintained until the positive electrode active material, by controlling its condition in a firing process. Therefore, it is important to control such that a composition distribution at inside of the particle of the nickel composite hydroxide will be similar to a composition distribution at inside of the particle of the positive electrode active material. By controlling as such, a cobalt rich layer or a manganese rich layer of the nickel composite hydroxide will be maintained also in the positive electrode active material.

As described in below, a nickel composite hydroxide is mixed with a lithium compound (lithium mixing process S30), and then fired (firing process S40), to form a positive electrode active material. A composition distribution of the nickel composite hydroxide is inherited to the positive electrode active material. Therefore, a composition distribution of entire nickel composite hydroxide may be similar to a composition distribution of a metal other than a lithium of a positive electrode active material to be obtained. Hereinafter, explaining about a cobalt rich layer and a manganese rich layer.

(Cobalt Rich Layer)

The nickel composite hydroxide relating to one embodiment of the present invention is having a cobalt rich layer from a surface of a particle of secondary particles toward an inside of the particle of the secondary particles. A composition of the cobalt rich layer is composed of a nickel, a cobalt, a manganese, and an element M with an atomic ratio of Ni:Co:Mn:M=$1-x2-y2-z2$:$x2$:$y2$:$z2$ (wherein M is at least one element selected from a group consisting of a transition metal element other than Ni, Co, Mn, a II group element, and a XIII group element, x2 and y2 satisfy $x2=1$ and $y2=0$ or $x2/((1-x2-y2-z2)+y2) \geq 1$, and z2 is within a range of $0 \leq z2 \leq 0.1$). Here, x2 is within a range of $0.5 \leq x2 \leq 1$.

For example, the cobalt rich layer may comprise at least one of Ni and Mn as a metal other than Co. In this case, the cobalt rich layer comprises Co in an amount of one or more times of a sum (mol) of Ni and Mn. Also, for example, the cobalt rich layer may comprise Co solely as a metal, and its composition may be $Co(OH)_2$. In this case, it will be $y2=0$ and $x2=1$. In addition, a composition of the cobalt rich layer can be determined, for example, by a quantitative analysis of an energy dispersive X-ray analysis (EDX) in a cross-sectional observation of a scanning electron microscope. Also, a composition of the cobalt rich layer can be adjusted to a desired range, for example, by controlling a metallic composition of a second mixed aqueous solution in a particle growth process (S20) described in below. In addition, the cobalt rich layer may also comprise an additive element M other than a nickel, a cobalt, and a manganese, if it is not having an influence on an effect of the present invention. For example, it may comprise a transition metal element other than Ni, Co, Mn, a II group element, or a XIII group element. M(z2) is $0 \leq z2 \leq 0.1$.

Also, a thickness t of the cobalt rich layer is 1% or more and 10% or less with respect to a diameter d of the secondary particles. In addition, a thickness t of the cobalt rich layer can be determined by a linear analysis or a composition mapping by EDX. Also, a diameter d of the secondary particles can be determined by a cross-sectional observation of the secondary particles by using a scanning electron microscope. A thickness t of the cobalt rich layer and a diameter d of the secondary particles may vary between the secondary particles, so it is preferable to determine as a mean value by measuring plural secondary particles, and for example, it can be determined from a mean value when measuring 30 secondary particles selected randomly.

(Manganese Rich Layer)

The nickel composite hydroxide relating to one embodiment of the present invention is having a manganese rich layer from a surface of a particle of secondary particles toward an inside of the particle of the secondary particles. A composition of the manganese rich layer is composed of a nickel, a cobalt, a manganese, and an element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=0 and y2=1 or y2/((1−x2−y2−z2)+x2)≥1, and z2 is within a range of 0≤z2≤0.1). Here, y2 is within a range of 0.5≤y2≤1.

For example, the manganese rich layer may comprise at least one of Ni and Co as a metal other than Mn. In this case, the manganese rich layer comprises Mn in an amount of one or more times of a sum (mol) of Ni and Co. Also, for example, the manganese rich layer may comprise Mn solely as a metal, and its composition may be $Mn(OH)_2$. In this case, it will be x2=0 and y2=1. In addition, a composition of the manganese rich layer can be determined, for example, by a quantitative analysis of an energy dispersive X-ray analysis (EDX) in a cross-sectional observation of a scanning electron microscope. Also, a composition of the manganese rich layer can be adjusted to a desired range, for example, by controlling a metallic composition of a second mixed aqueous solution in a particle growth process (S20) described in below. In addition, the manganese rich layer may also comprise an additive element M other than a nickel, a cobalt, and a manganese, if it is not having an influence on an effect of the present invention. For example, it may comprise a transition metal element other than Ni, Co, Mn, a II group element, or a XIII group element. M(z2) is 0≤z2≤0.1.

Also, a thickness t of the manganese rich layer is 1% or more and 10% or less with respect to a diameter d of the secondary particles. In addition, a thickness t of the manganese rich layer can be determined by a linear analysis or a composition mapping by EDX. Also, a diameter d of the secondary particles can be determined by a cross-sectional observation of the secondary particles by using a scanning electron microscope. A thickness t of the manganese rich layer and a diameter d of the secondary particles may vary between the secondary particles, so it is preferable to determine as a mean value by measuring plural secondary particles, and for example, it can be determined from a mean value when measuring 30 secondary particles selected randomly.

(Low-Density Layer)

The nickel composite hydroxide relating to one embodiment of the present invention is having a layered low-density layer between the cobalt rich layer or the manganese rich layer and a center of a particle of the secondary particles. About an internal structure of a particle of the nickel composite hydroxide, a composition distribution in the particle can be maintained without limiting a firing temperature, as a diffusion of a composition in the particle at the time of firing will be inhibited by introducing the layered low-density layer between the cobalt rich layer or the manganese rich layer and a center of the particle.

Also, a thickness s of the low-density layer is 1% or more and 10% or less with respect to a diameter d of the secondary particles. When a thickness s of the low-density layer is less than 1% with respect to a diameter d of the secondary particles, a void layer will not be formed in the following firing process, and the cobalt rich layer or the manganese rich layer will not be formed by a diffusion of a composition. Also, when it is more than 10%, a particle density or a filling ability of a positive electrode active material obtained finally will be decreased significantly. In addition, a thickness s of the low-density layer can be determined by a cross-sectional observation of the secondary particles by using a scanning electron microscope. A thickness s of the low-density layer and a diameter d of the secondary particles may vary between the secondary particles, so it is preferable to determine as a mean value by measuring plural secondary particles, and for example, it can be determined from a mean value when measuring 30 secondary particles selected randomly.

A structure and a composition at inside of the particle of the nickel composite hydroxide is having an influence on a structure and a composition at inside of a particle of a positive electrode active material. Therefore, by configuring a structure with the layered low-density layer and a composition of the cobalt rich layer to be within the above range, a cobalt rich layer including a lithium is formed also in an obtained positive electrode active material, and shows a low positive electrode resistance when used as a positive electrode of a battery. Also, by configuring a structure with the layered low-density layer and a composition of the manganese rich layer to be within the above range, a manganese rich layer including a lithium is formed also in an obtained positive electrode active material, and shows an excellent cycle characteristic when used as a positive electrode of a battery.

(Average Particle Size, Particle Size Distribution)

In a particle size distribution measured by a laser diffraction scattering method, it is preferable that a volume average particle size (Mv) of the nickel composite hydroxide is 4 micrometers or more and 10 micrometers or less. When the volume average particle size of the nickel composite hydroxide is within the above range, a volume average particle size of an obtained positive electrode active material can be controlled to be in a range of 4 micrometers or more and 10 micrometers or less, and a battery using this positive electrode active material can obtain excellent output characteristic and cycle characteristic.

In a particle size distribution measured by a laser diffraction scattering method, it is preferable that [(D90−D10)/Mv] indicating a particle size distribution width of the nickel composite hydroxide, which is calculated by a cumulative 90 volume % particle size (D90) and a cumulative 10 volume % particle size (D10), and the volume average particle size (Mv), is 0.60 or less. When the particle size distribution width of the nickel composite hydroxide is within the above range, a cycle characteristic and an output characteristic of an obtained positive electrode active material can be improved, as a mixing of fine particles or coarse particles is low. A particle size distribution of a positive electrode active material is strongly affected by the nickel composite hydroxide, so when the particle size distribution width of the nickel composite hydroxide is more than 0.60 and a particle size distribution is wide, fine particles and coarse particles may exist also in the positive electrode active material. It is difficult to inhibit a variation of a particle size completely, so a realistic lower limit of the particle size distribution width is about 0.30 or more.

In the [(D90−D10)/Mv], D10 means a particle size at which a cumulative volume of particles reaches 10% of a total volume of all particles when a number of particles in each particle size is counted from a smaller particle size. Also, D90 means a particle size at which a cumulative volume of particles reaches 90% of a total volume of all particles when a number of particles in each particle size is counted from a smaller particle size. A volume average particle size Mv, or D90 and D10 can be measured by using a laser diffraction scattering particle size analyzer.

<2. Method for Producing Nickel Composite Hydroxide>

A method for producing a nickel composite hydroxide relating to one embodiment of the present invention produces the nickel composite hydroxide by a crystallization reaction, by supplying an aqueous solution containing a nickel salt, a cobalt salt, and a manganese salt, a neutralizing agent, and a complexing agent, to a reaction vessel while stirring them. The method for producing the nickel composite hydroxide comprises a crystallization process in two stages. In other words, it comprises a nucleation process S10 for generating nuclei growing to be secondary particles, and a particle growth process S20 for growing the nuclei obtained in the nucleation process.

Further, the particle growth process S20 comprises: a first particle growth process S21 for performing a particle growth by supplying a first mixed aqueous solution to a slurry containing the nuclei formed in the nucleation process S10; a second particle growth process S22 for performing a particle growth by switching an atmosphere to an oxidizing atmosphere with an oxygen concentration of 5 volume % or more after the first particle growth process S21; and a third particle growth process S23 for performing a particle growth by supplying a second mixed aqueous solution containing a metal salt with a molar ratio similar to a molar ratio of Ni, Co, and Mn in a cobalt rich layer or in a manganese rich layer, and by switching an atmosphere to a non-oxidizing atmosphere with an oxygen concentration of less than 5 volume %. In other words, in the third particle growth process S23, the cobalt rich layer or the manganese rich layer is formed from a surface of a particle of secondary particles toward an inside of the particle of the secondary particles.

In addition, about a method for producing a nickel composite hydroxide including a batch crystallization process in such two stages, it is disclosed for example in Patent Literature 2, Patent Literature 3, and else, so detailed conditions can be adjusted accordingly by referring to these documents. The method for producing the nickel composite hydroxide can obtain a composite hydroxide having a uniform particle size with a narrow particle size distribution, by including the crystallization process in two stages. In addition, following explanation is an example of the method for producing the nickel composite hydroxide, and it is not limited to this method.

(Nucleation Process S10)

At first, in a nucleation process S10, a nucleation occurs preferentially in an aqueous solution for nucleation formed by adjusting a first mixed aqueous solution containing at least one of a nickel salt, cobalt salt, and a manganese salt such that a pH of the first mixed aqueous solution on the basis of a liquid temperature of 25° C. will be 12.5 or more, in a non-oxidizing atmosphere with an oxygen concentration of less than 5 volume %. In addition, when elements other than a nickel, a cobalt, and a manganese are added, it is preferable to add a salt of an additive element to the first mixed aqueous solution.

In the nucleation process S10, a pH of the aqueous solution for nucleation on the basis of a liquid temperature of 25° C. is controlled to be within a range of 12.5 or more, preferably 12.5 or more and 14.0 or less, more preferably 12.5 or more and 13.5 or less. When a pH of the aqueous solution for nucleation is controlled to be in the above range, nuclei are generated sufficiently. When a pH of the aqueous solution for nucleation on the basis of a liquid temperature of 25° C. is less than 12.5, nuclei are generated but nuclei themselves will be large, so secondary particle in which primary particles are aggregated is not obtained in the following particle growth process S20. On the other hand, fine crystal nuclei can be obtained as the pH becomes higher, but when the pH is more than 14.0, problems occur such as a reaction solution will be gelled and a crystallization will be difficult, or plate-like primary particles composing secondary particles of the nickel composite hydroxide will be too small.

A pH can be controlled by adding an inorganic alkaline solution which is a neutralizing agent. The inorganic alkaline solution is not limited particularly, and a general alkali metal hydroxide aqueous solution, for example a sodium hydroxide, a potassium hydroxide, or the like, can be used. An alkali metal hydroxide can be added directly to the mixed aqueous solution, but from an easiness of a pH control, it is preferable to add as an aqueous solution. In this case, a concentration of the alkali metal hydroxide aqueous solution is preferably 12.5 mass % or more and 30 mass % or less, more preferably 20 mass % or more and 25 mass % or less. When a concentration of the alkali metal hydroxide aqueous solution is low, a slurry concentration will be decreased and a productivity will be deteriorated, so it is preferable to increase the concentration, and concretely, it is preferable that a concentration of the alkali metal hydroxide aqueous solution will be 20 mass % or more. On the other hand, when a concentration of the alkali metal hydroxide aqueous solution is more than 30 mass %, a pH at a position of addition will be high locally, and fine particles may be generated.

In the nucleation process S10, a nucleation is performed by forming an aqueous solution for nucleation in which a pH is maintained in the above range, for example, by preparing a pre-reaction aqueous solution in which a pH is adjusted to be 12.5 or more by adding a water to an inorganic alkaline aqueous solution in advance, and by supplying a first mixed aqueous solution containing a nickel salt, a cobalt salt, and a manganese salt to a reaction tank while stirring this pre-reaction aqueous solution in the reaction tank, and also, by adding an inorganic alkaline aqueous solution (neutralizing agent) such as a sodium hydroxide to the reaction tank. Such method for supplying the mixed aqueous solution while maintaining a pH of the aqueous solution for nucleation is preferable as a nucleation is easy as a pH can be controlled exactly. In addition, an ammonia aqueous solution (complexing agent) may be added to the aqueous solution for nucleation, together with the inorganic alkaline aqueous solution (neutralizing agent). For example, a concentration of ammonium ions in the aqueous solution for nucleation is preferably 3 g/L or more and 25 g/L or less.

The first mixed aqueous solution used in the nucleation process S10 contains a nickel salt, cobalt salt, and a manganese salt. As these metal salts, a sulfate, a nitrate, a chloride, and else can be used, and from points of view of a cost, impurities, and a waste liquid treatment, it is preferable to use a sulfate. In addition, when elements other than a nickel, a cobalt, and a manganese are added, it is preferable to add a salt of an additive element to the first mixed aqueous solution.

A concentration of the first mixed aqueous solution is preferably from 1.0 mol/L to 2.2 mol/L, more preferably 1.5 mol/L to 2.0 mol/L, in a sum of each metal salt. When a concentration of the first mixed aqueous solution is low, an amount of the first mixed aqueous solution to be added will be increased, and a nucleation is not performed efficiently. Also, when a concentration of the first mixed aqueous solution is high, it will be near a saturated concentration in a room temperature, so there is a risk such that a pipe of a facility will be clogged as crystals will be redeposited.

A composition of the first mixed aqueous solution is determined accordingly, by considering a composition of a cobalt rich layer or a manganese rich layer, such that a composition of the nickel composite hydroxide obtained finally will be a desired composition.

A temperature of the aqueous solution for nucleation in the nucleation process S10 is preferably maintained to be 40° C. or more and 70° C. or less respectively. When a temperature is within the above range, a particle size of the nickel composite hydroxide can be grown to an aimed range.

(Particle Growth Process S20)

Next, in a particle growth process S20, after an end of the nucleation process S10, a slurry containing nuclei formed in the nucleation process S10 (slurry for particle growth) is adjusted such that a pH on the basis of a liquid temperature of 25° C. will be in a range of 10.5 or more and 12.5 or less, and also, that the pH will be lower than a pH in the nucleation process S10.

A pH of the slurry for particle growth on the basis of a liquid temperature of 25° C. is controlled to be in a range of 10.5 or more and 12.5 or less, preferably 11.0 or more and 12.0 or less, and also, to be lower than a pH in the nucleation process S10. When the pH of the slurry for particle growth is controlled to be in the above range, only a growth and an aggregation of nuclei generated in the nucleation process S10 occurs preferentially, and new nucleation will be inhibited, so an obtained nickel composite hydroxide will be uniform, and also, a range of a particle size distribution will be narrow, and its shape will be controlled. When the pH on the basis of a liquid temperature of 25° C. is less than 10.5, impurities contained in an obtained nickel composite hydroxide, for example an anionic constituent element contained in a metal salt, will be increased. Also, when the pH is more than 12.5, new nuclei will be generated in the particle growth process, and a particle size distribution will also be deteriorated. Also, from a point of view of separating the nucleation process S10 and the particle growth process S20 more clearly, a pH of the slurry for particle growth is preferably controlled to be lower than a pH in the nucleation process by 0.5 or more, more preferably controlled to be lower than a pH in the nucleation process by 1.0 or more.

A temperature of the slurry for particle growth in the particle growth process S20 is preferably maintained to be 40° C. or more and 70° C. or less respectively. When the temperature is within the above range, a particle size of the nickel composite hydroxide can be grown to an aimed range. When the temperature is less than 40° C., a particle size distribution will be deteriorated, as many nucleation occurs in the particle growth process S20 and there will be many fine particles, as a solubility of a metal salt in a mixed aqueous solution is low and a salt concentration is low. Also, when a temperature of the mixed aqueous solution is more than 70° C., a lot of ammonia will be volatilized, and a concentration of a nickel ammine complex will not be stable.

In addition, it is preferable to add an ammonia to the slurry for particle growth as a complexing agent. An ammonia concentration in the slurry for particle growth at that time is preferably controlled to be 5 g/L or more and 20 g/L or less. An ammonia functions as a complexing agent, so when an ammonia concentration is less than 5 g/L, a solubility of metal ions will not be maintained constantly, so primary particles grown from nuclei will be heterogeneous, and it will be a cause of a variation in a particle size width of nickel composite hydroxides. When an ammonia concentration is more than 20 g/L, a solubility of metal ions will be too much high, so an amount of metal ions remaining in the slurry for particle growth will be increased, and a deviation in a composition or the like may occur. Also, when an ammonia concentration is changed, a solubility of metal ions will be changed, and uniform nickel composite hydroxides will not be formed, so it is preferable to maintain an ammonia concentration in a constant value. It is preferable to maintain in a desirable ammonia concentration, for example, by controlling a change in an ammonia concentration with respect to a set concentration to be in a range of about 5 g/L in an increase or in a decrease.

An addition of an ammonia is performed by an ammonium ion supplier, but the ammonium ion supplier is not limited particularly, and for example, an ammonia, an ammonium sulfate, an ammonium chloride, an ammonium carbonate, an ammonium fluoride, or the like can be used.

The particle growth process S20 is separated in following three stages, according to a combination of an atmosphere and a mixed aqueous solution to be added.

(First Particle Growth Process S21)

A first particle growth process S21 corresponds to a process for forming a center of a particle of the nickel composite hydroxide. In the first particle growth process S21, a first mixed aqueous solution is supplied to a slurry containing nuclei in a non-oxidizing atmosphere with an oxygen concentration of less than 5 volume %. By setting an oxygen concentration to be less than 5 volume %, unnecessary oxidization is inhibited and a center of a particle with a high density can be obtained. It is explained about the first mixed aqueous solution in the nucleation process S10, so its explanation is omitted. In addition, the first mixed aqueous solution used in the nucleation process S10 and the first mixed aqueous solution used in the first particle growth process S21 may be changed as long as a composition of the nickel composite hydroxide obtained finally can be controlled to a desired composition. However, from a point of view of facilitating the process, it is preferable to use a same composition.

(Second Particle Growth Process S22)

A second particle growth process S22 corresponds to a process for forming a low-density layer of the nickel composite hydroxide. The second particle growth process S22 is performed by crystallizing the first mixed aqueous solution by switching an atmosphere from the first particle growth process S21 to an oxidizing atmosphere with an oxygen concentration of 5 volume % or more. In this way, a layered low-density layer can be introduced to the nickel composite hydroxide.

A time for switching can be adjusted according to a thickness of the low-density layer, but for example, it is preferable to switch to an oxidizing atmosphere after charging 12.5 atomic % or more and 80 atomic % or less, more preferably 50 atomic % or more and 70 atomic % or less in a sum of a nickel, a cobalt, a manganese, and an element M in all mixed aqueous solutions (including first and second mixed aqueous solutions) supplied from a start to an end of a crystallization. After switching to an oxidizing atmosphere, it is preferable to charge 2.5 atomic % or more and 10 atomic % or less in a sum of a nickel, a cobalt, a manganese, and an element M. Also, if a concentration and a supply rate of a mixed aqueous solution are constant, it can be switched by a crystallization time. In other words, an atmosphere may be switched when 12.5% to 80% of a crystallization time has passed from a start to an end of a crystallization, and an oxidizing atmosphere may be maintained for 2.5% to 10% of a crystallization time. In this way, the low-density layer with a desired thickness is formed at a desired position.

(Third Particle Growth Process S23)

A third particle growth process S23 corresponds to a process for forming a cobalt rich layer or a manganese rich layer of the nickel composite hydroxide. The third particle growth process S23 is performed by switching an atmosphere from the second particle growth process S22 to a non-oxidizing atmosphere with an oxygen concentration of less than 5 volume %, and by switching a mixed aqueous solution to be supplied to a second mixed aqueous solution. The second mixed aqueous solution contains a lot of cobalt or manganese, so the cobalt rich layer or the manganese rich layer will be formed.

The second mixed aqueous solution used in the third particle growth process S23 for forming the cobalt rich layer contains at least a cobalt salt, and it may also contain a nickel salt or a manganese salt. As a metal salt, a sulfate, a nitrate, and a chloride can be used, and from points of view of a cost, impurities, and a waste liquid treatment, it is preferable to use a sulfate. The second mixed aqueous solution used in the third particle growth process S23 for forming the manganese rich layer contains at least a manganese salt, and it may also contain a nickel salt or a cobalt salt. As a metal salt, a sulfate, a nitrate, and a chloride can be used, and from points of view of a cost, impurities, and a waste liquid treatment, it is preferable to use a sulfate. In addition, when elements other than a nickel, a cobalt, and a manganese are added, it is preferable to add a salt of an additive element to the second mixed aqueous solution.

A composition of the second mixed aqueous solution used in the third particle growth process S23 for forming the cobalt rich layer is composed of a nickel, a cobalt, a manganese, and an element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=1 and y2=0 or x2/((1−x2−y2−z2)+y2)≥1, and z2 is within a range of 0≤z2≤0.1). A composition of the cobalt rich later formed in the third particle growth process S23 is inherited to a composition of a cobalt rich layer of a positive electrode active material obtained finally, so a composition of the second mixed aqueous solution is determined according to a composition the cobalt rich layer of the positive electrode active material obtained finally.

A composition of the second mixed aqueous solution used in the third particle growth process S23 for forming the manganese rich layer is composed of a nickel, a cobalt, a manganese, and an element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=0 and y2=1 or y2/((1−x2−y2−z2)+x2)≥1, and z2 is within a range of 0≤z2≤0.1). A composition of the manganese rich later formed in the third particle growth process S23 is inherited to a composition of a manganese rich layer of a positive electrode active material obtained finally, so a composition of the second mixed aqueous solution is determined according to a composition the manganese rich layer of the positive electrode active material obtained finally.

A concentration of the second mixed aqueous solution used in the third particle growth process S23 for forming the cobalt rich layer or the manganese rich layer is preferably from 1.0 mol/L to 2.2 mol/L, more preferably 1.5 mol/L to 2.0 mol/L, in a sum of each metal salt. When a concentration of the second mixed aqueous solution is low, an amount of the second mixed aqueous solution to be added will be increased, and a particle growth is not performed efficiently. Also, when a concentration of the second mixed aqueous solution is high, it will be near a saturated concentration in a room temperature, so there is a risk such that a pipe of a facility will be clogged as crystals will be redeposited.

From the above, according to the method for producing the nickel composite hydroxide relating to one embodiment of the present invention, a nickel composite hydroxide, wherein the nickel composite hydroxide comprises a nickel, a cobalt, a manganese, and an element M with an atomic ratio of Ni:Co:Mn:M=1−x1−y1−z1:x1:y1:z1 (general formula: $Ni_{1-x1-y1-z1}Co_{x1}Mn_{y1}M_{z1}(OH)_{2+\alpha1}$) (wherein M is at least one element selected from a group consisting of a transition metal element other than Ni, Co, Mn, a II group element, and a XIII group element, 0.15≤x1≤0.25, 0.15≤y1≤0.25, 0≤z1≤0.1, −0.2≤α1≤0.2), the nickel composite hydroxide is having a cobalt rich layer or a manganese rich layer from a surface of a particle of the secondary particles toward an inside of the particle of the secondary particles and a layered low-density layer between the cobalt rich layer or the manganese rich layer and a center of the particle of the secondary particles, the cobalt rich layer comprises a nickel, a cobalt, a manganese, and an element M with an atomic ratio of Ni:Co:Mn:M=1−x2−y2−z2:x2:y2:z2 (general formula: $Ni_{1-x2-y2-z2}Co_{x2}Mn_{y2}M_{z2}(OH)_{2+\alpha2}$) (wherein M is at least one element selected from a group consisting of a transition metal element other than Ni, Co, Mn, a II group element, and a XIII group element, x2 and y2 satisfy x2=1 and y2=0 or x2/((1−x2−y2−z2)+y2)≥1, z2 is within a range of 0≤z2≤0.1, and α2 is within a range of −0.2≤α2≤0.2), the manganese rich layer comprises a nickel, a cobalt, a manganese, and an element M with an atomic ratio of Ni:Co:Mn:M=1−x2−y2−z2:x2:y2:z2 (general formula: $Ni_{1-x2-y2-z2}Co_{x2}Mn_{y2}M_{z2}(OH)_{2+\alpha2}$) (wherein M is at least one element selected from a group consisting of a transition metal element other than Ni, Co, Mn, a II group element, and a XIII group element, x2 and y2 satisfy x2=0 and y2=1 or y2/((1−x2−y2−z2)+x2)≥1, z2 is within a range of 0≤z2≤0.1, and α2 is within a range of −0.2≤α2≤0.2), a thickness of the cobalt rich layer or the manganese rich layer is 1% or more and 10% or less with respect to a diameter of the secondary particles, and also, a thickness of the low-density layer is 1% or more and 10% or less with respect to a diameter of the secondary particles, is obtained.

<3. Positive Electrode Active Material for Lithium Ion Secondary Battery>

A positive electrode active material for a lithium ion secondary battery relating to one embodiment of the present invention is having a cobalt rich layer or a manganese rich layer from a surface of a particle of secondary particles toward an inside of the particle of the secondary particles and a layered void layer between the cobalt rich layer or the manganese rich layer and a center of the particle of the secondary particles. The positive electrode active material for the lithium ion secondary battery relating to one embodiment of the present invention is produced by mixing a lithium compound and a nickel composite hydroxide having a layered low-density layer between the cobalt rich layer or the manganese rich layer and the center of the particle to obtain a mixture, and by firing the mixture in a specific condition, to disperse a lithium in the secondary particles while the low-density layer is absorbed in the center of the particle to be the void layer, and also, while maintaining the cobalt rich layer or the manganese rich layer at the surface of the particle. The positive electrode active material for the lithium ion secondary battery is having the cobalt rich layer containing a lithium, and also, a lower positive electrode resistance can be obtained by obtaining particles with high crystallinity as described in below. Also, the positive electrode active material for the lithium ion secondary battery is having the manganese rich layer with a lithium, and also, a higher durability can be obtained by obtaining particles with high crystallinity as described in below.

The positive electrode active material for the lithium ion secondary battery relating to one embodiment of the present invention is composed of a lithium nickel composite oxide having a hexagonal crystal layered structure, which is composed of secondary particles to which plural primary particles are aggregated. Also, the lithium nickel composite oxide comprises a lithium, a nickel, a cobalt, a manganese, and an element M with an atomic ratio of Li:Ni:Co:Mn:M=1+u: $1-x1-y1-z1:x1:y1:z1$ (wherein $-0.05 \leq u \leq 0.50$, M is at least one element selected from a group consisting of a transition metal element other than Ni, Co, Mn, a II group element, and a XIII group element, $0.15 \leq x1 \leq 0.25$, $0.15 \leq y1 \leq 0.25$, $0 \leq z1 \leq 0.1$).

A mark u indicating an excess amount of a lithium is −0.05 or more and 0.50 or less, and preferably −0.05 or more and 0.20 or less. When u is less than −0.05, a reaction resistance of a positive electrode in the lithium ion secondary battery using the obtained positive electrode active material will be high, so an output of the secondary battery will be low. On the other hand, when u is more than 0.50, an initial discharge capacity of the secondary battery using this positive electrode active material will be decreased, and also, a reaction resistance of the positive electrode will be increased. From a point of view of achieving high capacity, u is preferably −0.02 or more and 0.10 or less. In addition, a composition of the positive electrode active material can be determined by an ICP emission spectrometry.

The cobalt rich layer in the positive electrode active material for the lithium ion secondary battery comprises a lithium, a nickel, a cobalt, a manganese, and an element M with an atomic ratio of Li:Ni:Co:Mn:M=1+u: $1-x2-y2-z2:x2:y2:z2$ (wherein $-0.05 \leq u \leq 0.50$, M is at least one element selected from a group consisting of a transition metal element other than Ni, Co, Mn, a II group element, and a XIII group element, x2 and y2 satisfy x2=1 and y2=0 or $x2/((1-x2-y2-z2)+y2) \geq 1$, and z2 is within a range of $0 \leq z2 \leq 0.1$). In addition, x2 is within a range of $0.5 \leq x2 \leq 1$.

The cobalt rich layer in the positive electrode active material for the lithium ion secondary battery does not comprise a nickel and a manganese (x2=1 and y2=0), or a ratio of cobalt with respect to a nickel and a manganese $[x2/((1-x2-y2-z2)+y2)]$ is 1 or more.

The manganese rich layer in the positive electrode active material for the lithium ion secondary battery comprises a lithium, a nickel, a cobalt, a manganese, and an element M with an atomic ratio of Li:Ni:Co:Mn:M=1+u: $1-x2-y2-z2:x2:y2:z2$ (wherein $-0.05 \leq u \leq 0.50$, M is at least one element selected from a group consisting of a transition metal element other than Ni, Co, Mn, a II group element, and a XIII group element, x2 and y2 satisfy x2=0 and y2=1 or $y2/((1-x2-y2-z2)+x2) \geq 1$, and z2 is within a range of $0 \leq z2 \leq 0.1$). In addition, y2 is within a range of $0.5 \leq y2 \leq 1$.

The manganese rich layer in the positive electrode active material for the lithium ion secondary battery does not comprise a nickel and a cobalt (x2=0 and y2=1), or a ratio of manganese with respect to a nickel and a cobalt $[y2/((1-x2-y2-z2)+x2)]$ is 1 or more.

A thickness of the cobalt rich layer or the manganese rich layer in the positive electrode active material for the lithium ion secondary battery is 1% or more and 10% or less with respect to a diameter of the secondary particles. In this way, a battery output or a cycle characteristic can be improved. When a thickness of the cobalt rich layer or the manganese rich layer is less than 1%, an output characteristic or a cycle characteristic cannot be improved sufficiently, by an influence of a composition at inside of the particle. On the other hand, when a thickness of the cobalt rich layer or the manganese rich layer is more than 10%, a battery capacity will be decreased as a composition of entire secondary particle will be cobalt rich or manganese rich, or an effect of improving a cycle characteristic cannot be obtained sufficiently as a ratio of a manganese composition y2 of the manganese rich layer will be less than 0.5. Also, a thickness of the cobalt rich layer or the manganese rich layer in the positive electrode active material can be determined by a linear analysis or a composition mapping by EDX. Also, a diameter of the secondary particles can be determined by an observation of the secondary particles by using a scanning electron microscope. A thickness of the cobalt rich layer and a diameter of the secondary particles may vary between the secondary particles, so it is preferable to determine as a mean value by measuring plural secondary particles (refer to the description of the nickel composite hydroxide). In addition, a composition of the cobalt rich layer or the manganese rich layer can be determined, for example, by a quantitative analysis of an energy dispersive X-ray analysis (EDX) in a cross-sectional observation of a scanning electron microscope, and the cobalt rich layer can be determined by the fact that a ratio of cobalt with respect to a sum of a nickel and a manganese (ratio of cobalt=composition ratio of cobalt/(composition ratio of nickel+composition ratio of manganese)) is 1 or more. Also, the manganese rich layer can be determined by the fact that a ratio of manganese with respect to a sum of a nickel and a cobalt (ratio of manganese=composition ratio of manganese/(composition ratio of nickel+composition ratio of cobalt)) is 1 or more.

A thickness of the layered void layer in the positive electrode active material for the lithium ion secondary battery is 1% or more and 10% or less with respect to a diameter of the secondary particles. In this way, a diffusion of a composition at inside of the particle is inhibited also at a firing temperature for obtaining particles with high crystallinity, so the cobalt rich layer or the manganese rich layer is maintained at a surface of the particle of the positive electrode active material, and an output characteristic or a cycle characteristic is improved. When a thickness of the void layer is less than 1%, an inhibition of a diffusion of a composition will be insufficient, and an output characteristic or a cycle characteristic will not be improved sufficiently. On the other hand, when a thickness of the void layer is more than 10%, a particle density or a filling ability of the secondary particles will be decreased significantly.

In the positive electrode active material for the lithium ion secondary battery, a crystallite diameter calculated from a peak of (003) face by an X-ray diffraction measurement is 100 nm or more and 150 nm or less. In this way, both of a high battery capacity and an excellent durability can be achieved. When the crystallite diameter is less than 100 nm, a crystallinity is highly likely to be insufficient, and a high output characteristic is hardly obtained. Also, when the crystallite diameter is more than 150 nm, a deterioration of various battery characteristics occurs by an excess firing.

In a particle size distribution measured by a laser diffraction scattering method, a volume average particle size (Mv) of the positive electrode active material for the lithium ion secondary battery is preferably 4 micrometers or more and 10 micrometers or less. In this way, a high output characteristic can be obtained.

In the positive electrode active material for the lithium ion secondary battery, [(D90–D10)/Mv] indicating a particle size distribution width, which is calculated by a cumulative 90 volume % particle size (D90) and a cumulative 10 volume % particle size (D10), and the volume average particle size (Mv), is preferably 0.60 or less. In this way, a mixing of fine particles or coarse particles is reduced, a high output characteristic with less variation can be obtained. In addition, the volume average particle size (Mv), D90 and D10 can be determined similar to the nickel composite hydroxide.

<4. Method for Producing Positive Electrode Active Material for Lithium Ion Secondary Battery>

A method for producing a positive electrode active material for a lithium ion secondary battery relating to one embodiment of the present invention comprises: a lithium mixing process S30 for forming a lithium mixture by mixing a nickel composite hydroxide and a lithium compound; and a firing process S40 for firing the lithium mixture at a temperature of 800° C. or more and 950° C. or less in an oxidizing atmosphere. Hereinafter, explaining about each process.

(Lithium Mixing Process S30)

In a lithium mixing process S30, the nickel composite hydroxide and a lithium compound are mixed to form a lithium mixture. The lithium compound is not limited particularly and publicly known lithium compound can be used, and for example, from a point of view of availability, a lithium hydroxide, a lithium nitrate, a lithium carbonate, or these mixtures are preferably used. Among them, as the lithium compound, from points of view of stability of quality and an easiness of handling, a lithium hydroxide or a lithium carbonate is more preferably used.

In the nickel composite hydroxide and the lithium compound, a ratio (Li/Me) of a number of atoms of a lithium (Li) and a number of atoms of metals other than a lithium (Me), i.e. a sum of a number of atoms of a nickel, a cobalt, and additive elements, in the lithium mixture is 0.95 to 1.50, preferably 0.95 to 1.20, more preferably 0.98 to 1.10. In other words, Li/Me does not change before and after a firing process, so Li/Me mixed in this lithium mixing process S30 will be Li/Me in a positive electrode active material, therefore Li/Me in the lithium mixture is mixed to be same as Li/Me in a positive electrode active material to be obtained.

Also, a general mixer can be used for a mixing, and for example, a shaker mixer, a Loedige mixer, a Julia mixer, a V blender, or the like can be used, and it is fine as long as they are mixed sufficiently to the extent that a shape of the nickel composite hydroxide will not be destroyed.

(Firing Process S40)

In a firing process S40, the lithium mixture is fired at a temperature of 800° C. to 950° C. in an oxidizing atmosphere. A firing is preferably performed at a temperature of 800° C. to 950° C. in an oxidizing atmosphere. When a firing temperature is less than 800° C., a high crystallinity cannot be obtained, and a high output characteristic cannot be obtained when it is used in a battery. On the other hand, when the firing temperature is more than 950° C., a cation mixing occurs by an excess firing, in which various transition metals enter a lithium site, and various battery characteristics will be deteriorated. Also, a firing time is not limited particularly, but it is preferably about 1 hour or more and 24 hours or less.

In addition, from a point of view of reacting the nickel composite hydroxide or a nickel composite oxide and the lithium compound uniformly, it is preferable to rise a temperature to the above temperature with a temperature rising rate of 1° C./min to 5° C./min. Further, they can be reacted more uniformly, by maintaining a temperature for about 1 hour or more and 10 hours or less at a temperature near a melting point of the lithium compound.

From the above, according to a method for producing a positive electrode active material for a lithium ion secondary battery relating to one embodiment of the present invention, the positive electrode active material for the lithium ion secondary battery comprising a lithium, a nickel, a cobalt, a manganese, and an element M with an atomic ratio of Li:Ni:Co:Mn:M=1+u: 1−x1−y1−z1:x1:y1:z1 (general formula: $Li_{1+u}Ni_{1-x1-y1-z1}Co_{x1}Mn_{y1}M_{z1}O_{2+\beta 1}$) (wherein −0.05≤u≤0.50, M is at least one element selected from a group consisting of a transition metal element other than Ni, Co, Mn, a II group element, and a XIII group element, 0.15≤x1≤0.25, 0.15≤y1≤0.25, 0≤z1≤0.1, −0.2≤β1≤0.2), wherein the positive electrode active material for the lithium ion secondary battery is having a cobalt rich layer or a manganese rich layer from a surface of a particle of the secondary particles toward an inside of the particle of the secondary particles and a layered void layer between the cobalt rich layer or the manganese rich layer and a center of the particle of the secondary particles, the cobalt rich layer comprises a lithium, a nickel, a cobalt, a manganese, and an element M with an atomic ratio of Li:Ni:Co:Mn:M=1+u: 1−x2−y2−z2:x2:y2:z2 (general formula: $Li_{1+u}Ni_{1-x2-y2-z2}Co_{x2}Mn_{y2}M_{z2}O_{2+\beta 2}$) (wherein −0.05≤u≤0.50, M is at least one element selected from a group consisting of a transition metal element other than Ni, Co, Mn, a II group element, and a XIII group element, x2 and y2 satisfy x2=1 and y2=0 or x2/((1−x2−y2−z2)+y2)≥1, z2 is within a range of 0≤z2≤0.1, and β2 is within a range of −0.2≤β2≤0.2), the manganese rich layer comprises a lithium, a nickel, a cobalt, a manganese, and an element M with an atomic ratio of Li:Ni:Co:Mn:M=1+u: 1−x2−y2−z2:x2:y2:z2 (general formula: $Li_{1+u}Ni_{1-x2-y2-z2}Co_{x2}Mn_{y2}M_{z2}O_{2+\beta 2}$) (wherein −0.05≤u≤0.50, M is at least one element selected from a group consisting of a transition metal element other than Ni, Co, Mn, a II group element, and a XIII group element, x2 and y2 satisfy x2=0 and y2=1 or y2/((1−x2−y2−z2)+x2)≥1, z2 is within a range of 0≤z2≤0.1, and β2 is within a range of −0.2≤β2≤0.2), a thickness of the cobalt rich layer or the manganese rich layer is 1% or more and 10% or less with respect to a diameter of the secondary particles, and also, a thickness of the void layer is 1% or more and 10% or less with respect to a diameter of the secondary particles, is obtained.

<5. Lithium Ion Secondary Battery>

A lithium ion secondary battery relating to one embodiment of the present invention comprises a positive electrode including the positive electrode active material for the lithium ion secondary battery. Also, the lithium ion secondary battery can be composed of components similar to a general lithium ion secondary battery, and for example, comprises a positive electrode, a negative electrode, and a non-aqueous electrolyte solution. In addition, an embodiment explained in below is only an example, and a lithium ion secondary battery of the present embodiment can be performed in forms with various modifications and improvements based on a knowledge of a person skilled in the art, based on the embodiment described in the present description. In addition, an intended use of a lithium ion secondary battery of the present embodiment is not limited particularly.

(a) Positive Electrode

A positive electrode of a lithium ion secondary battery is produced, for example as below, by using the above-mentioned positive electrode active material for the lithium ion secondary battery. At first, a powdery positive electrode active material, a conductive material, and a binding agent are mixed, and according to need, an activated carbon and a solvent intended to control a viscosity are added, and these materials are kneaded to produce a positive electrode mixture paste. A mixing ratio of each component in the positive electrode mixture paste is similar to which of a positive electrode of a general lithium ion secondary battery, and for example, when a total mass of a solid content in the positive electrode mixture paste excluding a solvent is 100 mass parts, a content of the positive electrode active material is preferably 60 to 95 mass parts, a content of the conductive material is preferably 1 to 20 mass parts, and a content of the binding agent is preferably 1 to 20 mass parts.

The obtained positive electrode mixture paste is coated, for example on a surface of a current collector made of an aluminum foil, and dried to scatter the solvent. In addition, it may be pressed by a roll press device or the like, in order to increase an electrode density according to need. In this way, a sheet-like positive electrode can be produced. The sheet-like positive electrode can be used for a production of a battery by cutting or the like into an appropriate size according to an aimed battery. However, a method for producing the positive electrode is not limited to the above exemplified method, and other method may be used.

As the conductive material, for example a graphite (natural graphite, artificial graphite, expanded graphite, or the like), or a carbon black material such as an acetylene black or a Ketjen black, may be used.

The binding agent serves a function to bind active material particles, and for example, a polyvinylidene fluoride (PVDF), a polytetrafluoroethylene (PTFE), a fluororubber, an ethylene propylene diene rubber, a styrene butadiene, a cellulose resin, a polyacrylic acid or the like, may be used as the binding agent.

In addition, according to need, a solvent for dissolving the binding agent and for dispersing the positive electrode active material, the conductive material, and an activated carbon may be added to a positive electrode mixture. As the solvent, an organic solvent such as N-methyl-2-pyrrolidone can be used concretely. In addition, the activated carbon may be added to the positive electrode mixture, in order to increase an electric double layer capacity.

(b) Negative Electrode

As a negative electrode, a metal lithium, a lithium alloy, or the like may be used, or a negative electrode mixture in paste form, which is prepared by mixing a binding agent and adding an appropriate solvent to a negative electrode active material capable of an insertion and a deinsertion of lithium ions, coated on a surface of a metal foil current collector such as a copper, and dried, and compressed to increase an electrode density according to need, may be used.

As the negative electrode active material, for example, an organic compound fired body such as a natural graphite, an artificial graphite and a phenol resin, and a powder body of a carbon material such as a coke may be used. In this case, as the binding agent for the negative electrode, a fluorine-containing resin such as a PVDF may be used as well as the positive electrode, and as a solvent for dispersing these active material and binding agent, an organic solvent such as N-methyl-2-pyrrolidone may be used.

(c) Separator

A separator is arranged to be interposed between the positive electrode and the negative electrode. The separator retains an electrolyte and separates the positive electrode and the negative electrode, and for example, a thin film of a polyethylene, a polypropylene or the like having numerous fine holes may be used.

(d) Non-Aqueous Electrolyte

As a non-aqueous electrolyte, a non-aqueous electrolyte solution may be used. As the non-aqueous electrolyte solution, an electrolyte solution in which a lithium salt is dissolved in an organic solvent as a supporting salt may be used. Also, as the non-aqueous electrolyte solution, an electrolyte solution in which a lithium salt is dissolved in an ionic liquid may be used. In addition, the ionic liquid is composed of cations and anions other than a lithium ion, and which is a salt in a form of a liquid in a room temperature.

As the organic solvent, it is possible to use one kind solely or by mixing two kinds or more selected from: a cyclic carbonate such as an ethylene carbonate, a propylene carbonate, a butylene carbonate, and a trifluoro propylene carbonate; a chain carbonate such as a diethyl carbonate, a dimethyl carbonate, an ethyl methyl carbonate, and a dipropyl carbonate; an ether compound such as a tetrahydrofuran, a 2-methyl tetrahydrofuran, and a dimethoxyethane; a sulfur compound such as an ethyl methyl sulfone and a butane sultone; and a phosphor compound such as a triethyl phosphate and a trioctyl phosphate.

As the supporting salt, $LiPF_6$, $LiBF_4$, $LiClO_4$, $LiAsF_6$, $LiN(CF_3SO_2)_2$ and a combined salt thereof may be used. Further, the non-aqueous electrolyte solution may contain a radical scavenger, a surfactant, a flame retardant or the like.

In addition, as the non-aqueous electrolyte, a solid electrolyte may be used. The solid electrolyte is having a characteristic to resist a high voltage. As the solid electrolyte, inorganic solid electrolyte and organic solid electrolyte may be cited.

As the inorganic solid electrolyte, an oxide-based solid electrolyte, a sulfide-based solid electrolyte or the like may be used.

As the oxide-based solid electrolyte, it is not limited particularly, and any solid electrolyte may be used as long as it contains an oxygen (O), and also, it is having a lithium ion conductivity and an electron insulating property. As the oxide-based solid electrolyte, for example, a lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+x}Al_xTi_{2-x}(PO_4)_3$ (0≤x≤1), $Li_{1+x}Al_xGe_{2-x}(PO_4)_3$ (0≤x≤1), $LiTi_2(PO_4)_3$, $Li_{3x}La_{2/3-x}TiO_3$ (0≤x≤2/3), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, or the like may be cited.

As the sulfide-based solid electrolyte, it is not limited particularly, and any solid electrolyte may be used as long as it contains a sulfur (S), and also, it is having a lithium ion conductivity and an electron insulating property. As the sulfide-based solid electrolyte, for example, $Li_2S-P_2S$, $Li_2S-SiS_2$, $LiI-Li_2S-SiS_2$, $LiI-Li_2S-P_2S_5$, $LiI-Li_2S-B_2S_3$, $Li_3PO_4-Li_2S-SiS$, $LiI-Li_2S-P_2O_5$, $LiI-PO_4-P_2S$, or the like may be cited.

In addition, as the inorganic solid electrolyte, a solid electrolyte other than the above solid electrolyte may be used, and for example, $Li_3N$, $LiI$, $Li_3N-LiI-LiOH$, or the like may be used.

As the organic solid electrolyte, it is not limited particularly, as long as it is a polymer compound having an ion conductivity, and for example, a polyethylene oxide, a polypropylene oxide, a copolymer thereof, or the like may be used. In addition, the organic solid electrolyte may comprise the supporting salt (lithium salt).

(e) Structure and Shape of Battery

A lithium ion secondary battery relating to one embodiment of the present invention is composed, for example by the positive electrode, the negative electrode, the separator and the non-aqueous electrolyte solution. In addition, a shape of the lithium ion secondary battery is not limited particularly, and it may be formed in various shapes such as a cylindrical shape or a laminated shape. Even when the lithium ion secondary battery is adopting any shape, the positive electrode and the negative electrode are laminated via the separator to form an electrode body, and the obtained electrode body is impregnated with the non-aqueous electrolyte solution, and a positive electrode current collector and a positive electrode terminal coupled to the outside, and also, a negative electrode current collector and a negative electrode terminal coupled to the outside are connected using current collecting lead wires or the like, and sealed in a battery case to complete the lithium ion secondary battery.

A lithium ion secondary battery relating to one embodiment of the present invention is having a low positive electrode resistance or an excellent cycle characteristic, by comprising a positive electrode composed of the above positive electrode active material.

EXAMPLES

Hereinafter, explaining in more detail about the present invention by using examples and comparative examples, but the present invention is not limited by these examples in any way. In addition, conditions for producing a nickel composite hydroxide and positive electrode active material for a lithium ion secondary battery are explained in each example and comparative example, and explaining in advance about measurements of a particle size distribution and a volume average particle size, a composition, SEM and EDX analysis, a production of a battery, and a positive electrode resistance.

(Measurements of Particle Size Distribution and Volume Average Particle Size)

A particle size distribution and a volume average particle size were measured by a laser diffraction particle size analyzer (manufactured by Nikkiso Co., Ltd., product name: Microtrac), and a tap density was measured by a shaking specific gravity measuring instrument (manufactured by Kuramochi Scientific Instrument Co., Ltd., KRS-409).

(Composition)

A composition of entire particles was confirmed by using an ICP emission spectrometer (manufactured by Shimadzu Corporation, ICPE-9000).

(SEM and EDX Analysis)

A structure of particles was observed by using a scanning electron microscope (manufactured by Hitachi High-Tech Corporation, product name: S-4700), in a condition capable of a cross-sectional observation of the particles by embedding a nickel composite hydroxide powder or a lithium nickel composite oxide powder in a resin, and by a focused ion beam processing.

A composition analysis of a cobalt rich layer or a manganese rich layer in a nickel composite hydroxide powder or a lithium nickel composite oxide powder was analyzed by using an energy dispersive X-ray spectrometer (EDX; manufactured by JEOL Ltd., product name: JED2300). An EDX detector was having a resolution: 137 eV, and conditions of measurement were a tube voltage of 20 kV, a tube current of 20 microampere, a magnification of 5000 times, WD of 15 mm, a process time of 4, and a counting of 4,000,000 counts.

(Production of Battery)

An evaluation of an obtained positive electrode active material for a lithium ion secondary battery was performed by producing and evaluating a battery as below. 52.5 mg of a positive electrode active material for a lithium ion secondary battery, 15 mg of acetylene black, and 7.5 mg of polytetrafluoroethylene resin (PTFE) were mixed, and press molded to a diameter of 11 mm and a thickness of 100 micrometers in a pressure of 100 MPa to produce a positive electrode PE (positive electrode for evaluation). The produced positive electrode was dried for 12 hours at 120° C. in a vacuum drier. And, a 2032 type coin battery was produced by using this positive electrode in a globe box of Ar atmosphere in which a dew point was controlled to −80° C.

As a negative electrode, a negative electrode sheet perforated in a disc shape with a diameter of 14 mm, in which a polyfluorovinylidene and a graphite powder with an average particle size of about 20 micrometers were coated to a copper foil, was used, and as an electrolyte solution, 3:7 mixed solution of an ethylene carbonate (EC) and a diethyl carbonate (DEC) with 1 M of $LiPF_6$ as a supporting electrolyte (manufactured by Tomiyama Pure Chemical Industries, Ltd.) was used. As a separator, a polyethylene porous film with a thickness of 25 micrometers was used. Also, the coin battery comprises a gasket and a wave washer, and assembled as a battery in a coin shape with a positive electrode can and a negative electrode can. A positive electrode resistance (output characteristic) and a cycle characteristic indicating a performance of the produced coin battery were evaluated as below.

(Positive Electrode Resistance)

A resistance value was measured by an alternate current impedance method, by using a 2032 type coin battery charged at a charging potential of 4.1 V. For a measurement, a frequency response analyzer and a potentio-galvanostat (manufactured by Solartron) were used, and when measured by an alternate current impedance method, a Nyquist plot was obtained. The Nyquist plot represents a sum of characteristic curves indicating a solution resistance, a negative electrode resistance and a capacity, and a positive electrode resistance and a capacity, so a value of a positive electrode resistance was calculated by a fitting calculation using an equivalent circuit.

(Cycle Characteristic)

Also, a capacity maintenance rate of 500 cycles was calculated by measuring a discharge capacity at 500 times with respect to an initial discharge capacity by repeating a charge and discharge cycle for 500 cycles. In the charge and discharge cycle, the 2032 type coin battery was used and charged until 4.1 V with a rate of 2 C, and after rested for 10 minutes, CC discharged until 3.0 V with a same rate, and rested for 10 minutes.

Hereinafter, explaining about production conditions of each example and comparative example in a nickel composite hydroxide and a positive electrode active material for a lithium ion secondary battery comprising a cobalt rich layer or a manganese rich layer.

About each example and comparative example in a nickel composite hydroxide comprising a cobalt rich layer and a positive electrode active material for a lithium ion secondary battery comprising a cobalt rich layer.

Example 1

As a first mixed aqueous solution (raw material solution), a composite solution of a nickel sulfate (nickel concentration: 84.0 g/L) and a manganese sulfate (manganese concentration: 31.0 g/L) was prepared, and as a second mixed aqueous solution (raw material solution), a composite solution of a nickel sulfate (nickel concentration: 38.0 g/L) and a cobalt sulfate (cobalt concentration: 79.0 g/L) was prepared.

25 L of a pure water was poured in a reaction tank (60 L), and a temperature in the reaction tank was set to 42° C. while stirring the pure water in a nitrogen atmosphere (an oxygen concentration in the reaction tank was 2 volume % or less), and then, appropriate amounts of a 25 mass % sodium hydroxide aqueous solution and a 25 mass % ammonia water were added to the pure water in the reaction tank such that a pH of a liquid in the reaction tank was adjusted to 12.8 on the basis of a liquid temperature of 25° C., and that an ammonia concentration in the liquid was adjusted to 10 g/L, to prepare a pre-reaction aqueous solution. Here, the first mixed aqueous solution was added to the pre-reaction aqueous solution at a rate of 130 ml/min, and simultaneously, the 25 mass % sodium hydroxide aqueous solution and the 25 mass % ammonia water were added to the pre-reaction aqueous solution at constant rates, and a crystallization was performed for 2 minutes and 30 seconds (nucleation process S10) while controlling a pH to 12.8 (pH of nucleation).

Then, only a supply of the 25 mass % sodium hydroxide aqueous solution was stopped temporarily until a pH on the basis of a liquid temperature of 25° C. was 11.6 (pH of particle growth), and after a pH reached 11.6, a supply of the 25 mass % sodium hydroxide aqueous solution was restarted, and while controlling a pH to be 11.6, a crystallization was continued for 2.2 hours in a non-oxidizing atmosphere (first particle growth process S21), and for 0.2 hours after switching to an oxidizing atmosphere (second particle growth process S22), and then, a crystallization was continued for 1.0 hour after switching to a non-oxidizing atmosphere, and also, by switching the first mixed aqueous solution (raw material solution) to the second mixed aqueous solution (third particle growth process S23), and a crystallization was finished. After an end of a crystallization, a product was washed by water, filtered, and dried to obtain nickel cobalt manganese composite hydroxide particles comprising a cobalt rich layer.

A composition of entire obtained nickel cobalt manganese composite hydroxide particles was measured by an emission spectrometer, and confirmed that Ni:Co:Mn=60:20:20. Also, a composition of the cobalt rich layer was confirmed that Ni:Co:Mn=33:67:0, by EDX.

Also, a cross section of the nickel cobalt manganese composite hydroxide particles comprising the cobalt rich layer was observed by SEM, and a thickness of the cobalt rich layer and a low-density layer were measured. Results are indicated in Table 1.

Next, the obtained nickel cobalt manganese composite hydroxide particles comprising the cobalt rich layer and a lithium carbonate, which was weighed such that a ratio of Li/Me was 1.04, were mixed sufficiently by using a shaker mixer (TURBULA TypeT2C manufactured by Willy A Bachofen (WAB)), and a lithium mixture was obtained. This lithium mixture was maintained and fired for 10 hours at 880° C. in an air flow (oxygen: 21 volume %), and then, disintegrated to obtain lithium nickel cobalt manganese composite oxide particles comprising a cobalt rich layer.

A composition of entire obtained lithium nickel cobalt manganese composite oxide particles comprising the cobalt rich layer was measured by an emission spectrometer, and confirmed that Li:Ni:Co:Mn=104:60:20:20. Also, a composition of the cobalt rich layer was confirmed that Li:Ni:Co:Mn=104:33:67:0, by EDX.

Also, a cross section of the lithium nickel cobalt manganese composite oxide particles comprising the cobalt rich layer was observed by SEM, and a thickness of the cobalt rich layer and a void layer were measured. Also, a battery was produced as the above, and a positive electrode resistance was measured. Evaluation results are indicated in Table 2.

Example 2

Nickel cobalt manganese composite hydroxide particles comprising a cobalt rich layer were obtained in a same manner as in Example 1, except that a first mixed aqueous solution (raw material solution) was prepared by a nickel sulfate (nickel concentration: 97.3 g/L) and a manganese sulfate (manganese concentration: 18.0 g/L), a second mixed aqueous solution (raw material solution) was prepared by a nickel sulfate (nickel concentration: 29.3 g/L), a cobalt sulfate (cobalt concentration: 58.9 g/L), and a manganese sulfate (manganese concentration: 27.5 g/L), and a third particle growth process was performed for 1.6 hours. Lithium nickel cobalt manganese composite oxide particles comprising a cobalt rich layer were obtained in a same manner as in Example 1, except that these nickel cobalt manganese composite hydroxide particles comprising the cobalt rich layer were used. Evaluation results are indicated in Table 1 and Table 2.

Example 3

Lithium nickel cobalt manganese composite oxide particles comprising a cobalt rich layer were obtained in a same manner as in Example 1, except that a firing temperature was 830° C. Evaluation results are indicated in Table 2.

Example 4

Lithium nickel cobalt manganese composite oxide particles comprising a cobalt rich layer were obtained in a same manner as in Example 1, except that a firing temperature was 930° C. Evaluation results are indicated in Table 2.

Comparative Example 1

Nickel cobalt manganese composite hydroxide particles were obtained in a same manner as in Example 1, except that only a composite solution of a nickel sulfate (nickel concentration: 70.4 g/L), a cobalt sulfate (cobalt concentration:

23.6 g/L), and a manganese sulfate (manganese concentration: 22.0 g/L) was used as a raw material solution, and a second mixed aqueous solution was not used, a nucleation process was performed for 2.5 minutes in a nitrogen atmosphere, and a first, a second, and a third particle growth processes were performed for 4 hours in a nitrogen atmosphere. Lithium nickel cobalt manganese composite oxide particles were obtained in a same manner as in Example 1, except that these nickel cobalt manganese composite hydroxide particles were used. Evaluation results are indicated in Table 1 and Table 2.

Comparative Example 2

A positive electrode active material was obtained and evaluated in a same manner as Example 1, except that a second particle growth process was performed in a nitrogen atmosphere. Evaluation results are indicated in Table 1 and Table 2.

Comparative Example 3

Nickel cobalt manganese composite hydroxide particles comprising a cobalt rich layer were obtained in a same manner as in Example 1, except that, as a first mixed aqueous solution (raw material solution), a composite solution of a nickel sulfate (nickel concentration: 75.6 g/L), a cobalt sulfate (cobalt concentration: 15.7 g/L), and a manganese sulfate (manganese concentration: 24.5 g/L) was prepared, and a nucleation process was performed for 2.5 minutes in a non-oxidizing atmosphere, and a crystallization was continued for 3.4 hours before a switching of a raw material solution in a particle growth process and for 0.2 hours after switching to an oxidizing atmosphere, and then, a crystallization was performed for 0.4 hours after switching to a non-oxidizing atmosphere, and also, by preparing a second mixed aqueous solution (composite solution) of a nickel sulfate (nickel concentration: 23.5 g/L) and a cobalt sulfate (cobalt concentration: 94.3 g/L). Lithium nickel cobalt manganese composite oxide particles comprising a cobalt rich layer were obtained in a same manner as in Example 1, except that these nickel cobalt manganese composite hydroxide particles comprising the cobalt rich layer were used. Evaluation results are indicated in Table 1 and Table 2.

Comparative Example 4

Nickel cobalt manganese composite hydroxide particles comprising a cobalt rich layer were obtained in a same manner as in Example 1, except that, as a first mixed aqueous solution (raw material solution), a composite solution of a nickel sulfate (nickel concentration: 87.6 g/L) and a manganese sulfate (manganese concentration: 27.3 g/L) was prepared, and a nucleation process was performed for 2.5 minutes in a non-oxidizing atmosphere, and a crystallization was continued for 1.4 hours before a switching of a raw material solution in a particle growth process and for 0.2 hours after switching to an oxidizing atmosphere, and then, a crystallization was performed for 2.4 hours after switching to a non-oxidizing atmosphere, and also, by preparing a composite solution of a nickel sulfate (nickel concentration: 58.4 g/L), a cobalt sulfate (cobalt concentration: 38.7 g/L), and a manganese sulfate (manganese concentration: 18.6 g/L) as a second mixed aqueous solution (raw material solution). Lithium nickel cobalt manganese composite oxide particles comprising a cobalt rich layer were obtained in a same manner as in Example 1, except that these nickel cobalt manganese composite hydroxide particles were used. Evaluation results are indicated in Table 1 and Table 2.

TABLE 1

| | Nickel hydroxide particle (Secondary particle) | | | | | | | | |
|---|---|---|---|---|---|---|---|---|---|
| | Average particle size (Mv) | (D90−D10)/Mv | Metal ratio | Low-density layer | | Cobalt rich layer | | | |
| | | | | Thickness | | Thickness | | Metal ratio | |
| | µm | — | (Ni:Co:Mn) | µm | % | µm | % | (Ni:Co:Mn) | Co |
| Example 1 | 5.4 | 0.56 | 60:20:20 | 0.24 | 4.4 | 0.41 | 7.6 | 33:67:0 | 0.67 |
| Example 2 | 5.6 | 0.53 | 60:20:20 | 0.26 | 4.6 | 0.52 | 9.3 | 25:50:25 | 0.50 |
| Example 3 | 5.4 | 0.56 | 60:20:20 | 0.24 | 4.4 | 0.41 | 7.6 | 33:67:0 | 0.67 |
| Example 4 | 5.4 | 0.56 | 60:20:20 | 0.24 | 4.4 | 0.41 | 7.6 | 33:67:0 | 0.67 |
| Comparative example 1 | 5.5 | 0.50 | 60:20:20 | 0 | 0 | 0 | 0 | — | — |
| Comparative example 2 | 5.3 | 0.50 | 60:20:20 | 0 | 0 | 0.41 | 7.7 | 33:67:0 | 0.67 |
| Comparative example 3 | 5.1 | 0.52 | 60:20:20 | 0.16 | 3.1 | 0.04 | 0.8 | 20:80:0 | 0.80 |
| Comparative example 4 | 5.2 | 0.53 | 60:20:20 | 0.33 | 6.3 | 0.69 | 13.3 | 50:33:17 | 0.33 |

TABLE 2

| | Production condition Firing temperature | Positive electrode active material Secondary particle | | | | | | | | Battery evaluation Positive electrode resistance |
|---|---|---|---|---|---|---|---|---|---|---|
| | | Average particle size (Mv) | (D90-D10)/Mv | Metal ratio (Li:Ni:Co:Mn) | Void Thickness μm | Void % | Cobalt rich layer Thickness μm | Cobalt rich layer % | Cobalt rich layer Metal ratio (Li:Ni:Co:Mn) | Crystallite diameter nm |
| | °C. | μm | — | | μm | % | μm | % | | nm | Ω |
| Example 1 | 880 | 5.2 | 0.52 | 104:60:20:20 | 0.22 | 4.2 | 0.33 | 6.3 | 104:33:67:0 | 120 | 0.84 |
| Example 2 | 880 | 5.3 | 0.56 | 104:60:20:20 | 0.24 | 4.5 | 0.46 | 8.7 | 104:25:50:25 | 118 | 0.95 |
| Example 3 | 830 | 5.2 | 0.52 | 104:60:20:20 | 0.22 | 4.2 | 0.36 | 6.9 | 104:33:67:0 | 108 | 0.90 |
| Example 4 | 930 | 5.1 | 0.48 | 104:60:20:20 | 0.22 | 4.3 | 0.31 | 6.1 | 104:33:67:0 | 139 | 0.79 |
| Comparative example 1 | 880 | 5.1 | 0.49 | 104:60:20:20 | 0 | 0 | 0 | 0 | — | 123 | 1.18 |
| Comparative example 2 | 880 | 5.0 | 0.49 | 104:60:20:20 | 0 | 0 | 0 | 0 | — | 121 | 1.00 |
| Comparative example 3 | 880 | 5.0 | 0.51 | 104:60:20:20 | 0.13 | 2.6 | 0.04 | 0.8 | 104:20:80:0 | 119 | 0.98 |
| Comparative example 4 | 880 | 5.0 | 0.49 | 104:60:20:20 | 0.30 | 6.0 | 0.55 | 11.0 | 104:50:33:17 | 124 | 1.32 |

About each example and comparative example in a nickel composite hydroxide comprising a manganese rich layer and a positive electrode active material for a lithium ion secondary battery comprising a manganese rich layer.

Example 5

As a first mixed aqueous solution (raw material solution), a composite solution of a nickel sulfate (nickel concentration: 78.3 g/L), a cobalt sulfate (cobalt concentration: 39.1 g/L), and a manganese sulfate (manganese concentration: 0.3 g/L) was prepared, and as a second mixed aqueous solution (raw material solution), a composite solution of a nickel sulfate (nickel concentration: 58.7 g/L) and a manganese sulfate (manganese concentration: 55.0 g/L) was prepared. A metal concentration of each mixed aqueous solution was 2 mol/L.

25 L of a pure water was poured in a reaction tank (60 L), and a temperature in the reaction tank was set to 42° C. while stirring the pure water in a nitrogen atmosphere (an oxygen concentration in the reaction tank is 2 volume % or less), and then, appropriate amounts of a 25 mass % sodium hydroxide aqueous solution and a 25 mass % ammonia water were added to the pure water in the reaction tank such that a pH of a liquid in the reaction tank was adjusted to 12.8 on the basis of a liquid temperature of 25° C., and that an ammonia concentration in the liquid was adjusted to 10 g/L, to prepare a pre-reaction aqueous solution. Here, the first mixed aqueous solution was added to the pre-reaction aqueous solution at a rate of 130 ml/min, and simultaneously, the 25 mass % sodium hydroxide aqueous solution and the 25 mass % ammonia water were added to the pre-reaction aqueous solution at constant rates, and a crystallization was performed for 2 minutes and 30 seconds (nucleation process S10) while controlling a pH to 12.8 (pH of nucleation).

Then, only a supply of the 25 mass % sodium hydroxide aqueous solution was stopped temporarily until a pH on the basis of a liquid temperature of 25° C. was 11.6 (pH of particle growth), and after a pH reached 11.6, a supply of the 25 mass % sodium hydroxide aqueous solution was restarted, and while controlling a pH to be 11.6, a crystallization was continued for 2.2 hours in a non-oxidizing atmosphere (first particle growth process S21), and for 0.2 hours after switching to an oxidizing atmosphere (air atmosphere) (second particle growth process S22), and then, a crystallization was continued for 1.6 hours after switching to a non-oxidizing atmosphere, and also, by switching the first mixed aqueous solution (raw material solution) to the second mixed aqueous solution (third particle growth process S23), and a crystallization is finished. After an end of a crystallization, a product was washed by water, filtered, and dried to obtain nickel cobalt manganese composite hydroxide particles comprising a manganese rich layer.

A composition of entire obtained nickel cobalt manganese composite hydroxide particles was measured by an emission spectrometer, and confirmed that Ni:Co:Mn=60:20:20. Also, a composition of the manganese rich layer was confirmed that Ni:Co:Mn=50:0:50, by EDX.

Also, a cross section of the nickel cobalt manganese composite hydroxide particles comprising the manganese rich layer was observed by SEM, and a thickness of the manganese rich layer and a low-density layer were measured. Results are indicated in Table 3.

Next, the obtained nickel cobalt manganese composite hydroxide particles comprising the manganese rich layer and a lithium carbonate, which was weighed such that a ratio of Li/Me was 1.04, were mixed sufficiently by using a shaker mixer (TURBULA TypeT2C manufactured by Willy A Bachofen (WAB)), and a lithium mixture was obtained. This lithium mixture was maintained and fired for 10 hours at 880° C. in an air flow (oxygen: 21 volume %), and then, disintegrated to obtain lithium nickel cobalt manganese composite oxide particles comprising a manganese rich layer.

A composition of entire obtained lithium nickel cobalt manganese composite oxide particles comprising the manganese rich layer was measured by an emission spectrometer, and confirmed that Li:Ni:Co:Mn=104:60:20:20. Also, a composition of the manganese rich layer was confirmed that Li:Ni:Co:Mn=104:50:0:50, by EDX.

Also, a cross section of the lithium nickel cobalt manganese composite oxide particles comprising the manganese rich layer was observed by SEM, and a thickness of the manganese rich layer and a void layer were measured. Also, a battery was produced as the above, and a cycle characteristic was evaluated. Evaluation results are indicated in Table 4.

Example 6

Nickel cobalt manganese composite hydroxide particles comprising a manganese rich layer were obtained in a same manner as in Example 5, except that a first mixed aqueous solution (raw material solution) was prepared by a nickel sulfate (nickel concentration: 79.5 g/L), a cobalt sulfate (cobalt concentration: 36.4 g/L), and a manganese sulfate (manganese concentration: 1.5 g/L), and a second mixed aqueous solution (raw material solution) was prepared by a nickel sulfate (nickel concentration: 23.5 g/L), a cobalt sulfate (cobalt concentration: 17.7 g/L), and a manganese sulfate (manganese concentration: 71.5 g/L). Lithium nickel cobalt manganese composite oxide particles comprising a manganese rich layer were obtained in a same manner as in Example 5, except that these nickel cobalt manganese composite hydroxide particles comprising the manganese rich layer were used. Evaluation results are indicated in Table 3 and Table 4.

Example 7

Lithium nickel cobalt manganese composite oxide particles comprising a manganese rich layer were obtained in a same manner as in Example 5, except that a firing temperature was 830° C. Evaluation results are indicated in Table 4.

Example 8

Lithium nickel cobalt manganese composite oxide particles comprising a manganese rich layer were obtained in a same manner as in Example 5, except that a firing temperature was 930° C. Evaluation results are indicated in Table 4.

Comparative Example 5

Nickel cobalt manganese composite hydroxide particles were obtained in a same manner as in Example 5, except that only a composite solution of a nickel sulfate (nickel concentration: 70.4 g/L), a cobalt sulfate (cobalt concentration: 23.6 g/L), and a manganese sulfate (manganese concentration: 22.0 g/L) was used as a raw material solution, and a second mixed aqueous solution was not used, a nucleation process was performed for 2.5 minutes in a nitrogen atmosphere, and a first, a second, and a third particle growth processes were performed for 4 hours in a nitrogen atmosphere. Lithium nickel cobalt manganese composite oxide particles were obtained in a same manner as in Example 5, except that these nickel cobalt manganese composite hydroxide particles were used. Evaluation results are indicated in Table 3 and Table 4.

Comparative Example 6

A positive electrode active material was obtained and evaluated in a same manner as Example 5, except that a second particle growth process was performed in a nitrogen atmosphere. Evaluation results are indicated in Table 3 and Table 4.

(Comparative Example 7

Nickel cobalt manganese composite hydroxide particles comprising a manganese rich layer were obtained in a same manner as in Example 5, except that, as a first mixed aqueous solution (raw material solution), a composite solution of a nickel sulfate (nickel concentration: 75.5 g/L), a cobalt sulfate (cobalt concentration: 26.2 g/L), and a manganese sulfate (manganese concentration: 14.7 g/L) was prepared, and a nucleation process was performed in a non-oxidizing atmosphere, and a crystallization was continued for 3.4 hours before a switching of a raw material solution in a particle growth process and for 0.2 hours after switching to an oxidizing atmosphere, and then, a crystallization was performed for 0.4 hours after switching to a non-oxidizing atmosphere, and also, by preparing a second mixed aqueous solution (composite solution) of a nickel sulfate (nickel concentration: 23.5 g/L) and a manganese sulfate (manganese concentration: 87.9 g/L). Lithium nickel cobalt manganese composite oxide particles comprising a manganese rich layer were obtained in a same manner as in Example 5, except that these nickel cobalt manganese composite hydroxide particles comprising the manganese rich layer were used. Evaluation results are indicated in Table 3 and Table 4.

Comparative Example 8

Nickel cobalt manganese composite hydroxide particles comprising a manganese rich layer were obtained in a same manner as in Example 5, except that, as a first mixed aqueous solution (raw material solution), a composite solution of a nickel sulfate (nickel concentration: 87.6 g/L), a cobalt sulfate (cobalt concentration: 29.3 g/L), and a manganese sulfate (manganese concentration: 0.6 g/L) was prepared, and a nucleation process was performed in a non-oxidizing atmosphere, and a crystallization was continued for 1.4 hours before a switching of a raw material solution in a particle growth process and for 0.2 hours after switching to an oxidizing atmosphere, and then, a crystallization was performed for 2.4 hours after switching to a non-oxidizing atmosphere, and also, by preparing a composite solution of a nickel sulfate (nickel concentration: 58.7 g/L), a cobalt sulfate (cobalt concentration: 19.7 g/L), and a manganese sulfate (manganese concentration: 33.6 g/L) as a second mixed aqueous solution (raw material solution). Lithium nickel cobalt manganese composite oxide particles comprising a manganese rich layer were obtained in a same manner as in Example 5, except that these nickel cobalt manganese composite hydroxide particles comprising the manganese rich layer were used. Evaluation results are indicated in Table 3 and Table 4.

TABLE 3

| | Nickel hydroxide particle (Secondary particle) | | | | | | | | |
|---|---|---|---|---|---|---|---|---|---|
| | Average particle size (Mv) | (D90-D10)/Mv | Metal ratio (Ni:Co:Mn) | Low-density layer | | Manganese rich layer | | | |
| | | | | Thickness | | Thickness | | Metal ratio | |
| | μm | — | | μm | % | μm | % | (Ni:Co:Mn) | Mn |
| Example 5 | 5.5 | 0.57 | 60:20:20 | 0.25 | 4.5 | 0.44 | 8.0 | 50:0:50 | 0.50 |
| Example 6 | 5.8 | 0.55 | 50:25:25 | 0.27 | 4.7 | 0.56 | 9.6 | 20:15:65 | 0.65 |
| Example 7 | 5.5 | 0.57 | 60:20:20 | 0.25 | 4.5 | 0.44 | 8.0 | 50:0:50 | 0.50 |
| Example 8 | 5.5 | 0.57 | 60:20:20 | 0.25 | 4.5 | 0.44 | 8.0 | 50:0:50 | 0.50 |
| Comparative example 5 | 5.4 | 0.51 | 60:20:20 | 0 | 0 | 0 | 0 | — | — |
| Comparative example 6 | 5.4 | 0.49 | 60:20:20 | 0 | 0 | 0.44 | 8.1 | 50:0:50 | 0.50 |
| Comparative example 7 | 5.5 | 0.54 | 60:20:20 | 0.15 | 2.7 | 0.05 | 0.9 | 20:0:80 | 0.80 |
| Comparative example 8 | 5.5 | 0.55 | 60:20:20 | 0.34 | 6.2 | 0.70 | 12.7 | 50:17:33 | 0.33 |

TABLE 4

| | | Positive electrode active material | | | | | | | | | |
|---|---|---|---|---|---|---|---|---|---|---|---|
| | Production condition Firing temperature | Secondary particle | | | | | | | | Crystallite diameter | Battery evaluation Cycle Characteristic |
| | | Average particle size (Mv) | (D90-D10)/Mv | Metal ratio (Li:Ni:Co:Mn) | Void | | Manganese rich layer | | | | |
| | | | | | Thickness | | Thickness | | Metal ratio (Li:Ni:Co:Mn) | | |
| | °C. | μm | — | | μm | % | μm | % | | nm | % |
| Example 5 | 880 | 5.2 | 0.52 | 104:60:20:20 | 0.21 | 4.0 | 0.36 | 6.9 | 104:50:0:50 | 121 | 92.3 |
| Example 6 | 880 | 5.3 | 0.56 | 104:50:25:25 | 0.23 | 4.3 | 0.48 | 9.1 | 104:20:15:65 | 116 | 91.6 |
| Example 7 | 830 | 5.2 | 0.52 | 104:60:20:20 | 0.21 | 4.0 | 0.36 | 6.9 | 104:50:0:50 | 110 | 92.6 |
| Example 8 | 930 | 5.1 | 0.48 | 104:60:20:20 | 0.21 | 4.1 | 0.35 | 6.9 | 104:50:0:50 | 145 | 91.0 |
| Comparative example 5 | 880 | 5.1 | 0.49 | 104:60:20:20 | 0 | 0 | 0 | 0 | — | 123 | 88.3 |
| Comparative example 6 | 880 | 5.0 | 0.49 | 104:60:20:20 | 0 | 0 | 0 | 0 | — | 120 | 88.9 |
| Comparative example 7 | 880 | 5.0 | 0.51 | 104:60:20:20 | 0.13 | 2.6 | 0.04 | 0.8 | 104:20:0:80 | 122 | 89.2 |
| Comparative example 8 | 880 | 5.0 | 0.49 | 104:60:20:20 | 0.28 | 5.6 | 0.59 | 11.8 | 104:50:17:33 | 118 | 89.7 |

About each example and comparative example in a nickel composite hydroxide comprising a cobalt rich layer and a positive electrode active material for a lithium ion secondary battery comprising a cobalt rich layer.

(Evaluation)

In examples 1 to 4, a positive electrode resistance will be low by having a layered void layer at inside of particles and a cobalt rich layer, so it can be understood that a high output characteristic is obtained. On the other hand, in comparative examples 1 and 2, a positive electrode resistance will be high as there is no cobalt rich layer in the comparative example 1, and as a cobalt rich layer was disappeared by a diffusion of a composition at inside of particles by a firing in the comparative example 2, so it can be understood that a high output characteristic is not obtained. In comparative example 3, a positive electrode resistance will be high as, although it is having a cobalt rich layer, thicknesses of the void layer and the low-density layer are less than 1% with respect to a diameter of secondary particles, so it can be understood that an effect for improving an output characteristic is low. In comparative example 4, a positive electrode resistance will be high as, although it is having a cobalt rich layer, a thickness of the cobalt rich layer is more than 10% with respect to a diameter of secondary particles, so it can be understood that an effect for improving an output characteristic is low.

About each example and comparative example in a nickel composite hydroxide comprising a manganese rich layer and a positive electrode active material for a lithium ion secondary battery comprising a manganese rich layer.

(Evaluation)

In examples 5 to 8, a cycle characteristic will be high by having a layered void layer at inside of particles and a manganese rich layer, so it can be understood that a high durability is obtained. On the other hand, in comparative examples 5 and 6, it can be understood that a high durability is not obtained, as there is no manganese rich layer in the comparative example 5, and as a manganese rich layer was disappeared by a diffusion of a composition at inside of particles by a firing in the comparative example 6. In comparative example 7 for improving a durability is low as, although it is having a manganese rich layer, thicknesses of the void layer and the low-density layer are less than 1% with respect to a diameter of secondary particles. In comparative example 8, it can be understood that an effect for improving a cycle characteristic is low as, although it is having a manganese rich layer, a thickness of the manganese rich layer is more than 10% with respect to a diameter of secondary particles.

From the above, a nickel composite hydroxide which is a precursor of a positive electrode active material for a lithium ion secondary battery excellent in a positive electrode resistance or a cycle characteristic was provided. Also, a method for producing the nickel composite hydroxide easily with high productivity was provided. Also, a positive electrode active material for a lithium ion secondary battery excellent in a positive electrode resistance or a cycle characteristic and a method for producing thereof, and a lithium ion secondary battery were provided.

In addition, it was explained in detail about each embodiment and each example of the present invention as the above, but it is easy for those who skilled in the art to understand that various modifications are possible without substantially departing from new matters and effects of the present invention. Therefore, all of such modified examples are included within the scope of the present invention.

For example, a term used at least once in the description or drawings together with a different term that is broader or the same in meaning can also be replaced by the different term in any place in the description or drawings. Further, the operations and the configurations of the nickel composite hydroxide, the method for producing the nickel composite hydroxide, the positive electrode active material for the lithium ion secondary battery, the method for producing the positive electrode active material for the lithium ion secondary battery, and the lithium ion secondary battery are not limited to those described in each embodiment and each example of the present invention, but may be carried out in various modifications.

GLOSSARY OF DRAWING REFERENCES

S10 Nucleation process
S20 Particle growth process
S21 First particle growth process
S22 Second particle growth process
S23 Third particle growth process
S30 Lithium mixing process
S40 Firing process

The invention claimed is:

1. A nickel composite hydroxide, which is composed of secondary particles to which plural primary particles are aggregated,
   wherein the nickel composite hydroxide comprises a nickel, a cobalt, a manganese, and optionally an element M with an atomic ratio of Ni:Co:Mn:M=1−x1−y1−z1:x1:y1:z1 (wherein M is at least one element selected from a group consisting of a transition metal element other than Ni, Co, Mn, a II group element, and a XIII group element, $0.15 \leq x1 \leq 0.25$, $0.15 \leq y1 \leq 0.25$, $0 \leq z1 \leq 0.1$),
   the nickel composite hydroxide has:
     a cobalt rich layer or a manganese rich layer from a surface of a particle of the secondary particles toward an inside of the particle of the secondary particles, and
     a low-density layer that is layered between the cobalt rich layer or the manganese rich layer and a center of the particle of the secondary particles, the low-density layer having a lower mass density relative to the remainder of the particle,
   the cobalt rich layer comprises a nickel, a cobalt, a manganese, and optionally an element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=1 and y2=0 or $x2/((1-x2-y2-z2)+y2) \geq 1$, and z2 is within a range of $0 \leq z2 \leq 0.1$),
   the manganese rich layer comprises a nickel, a cobalt, a manganese, and optionally an element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=0 and y2=1 or $y2/((1-x2-y2-z2)+x2) \geq 1$, and z2 is within a range of $0 \leq z2 \leq 0.1$),
   a thickness of the cobalt rich layer is 1% or more and less than 10% with respect to a diameter of the secondary particles or a thickness of the manganese rich layer is 1% or more and 10% or less with respect to the diameter of the secondary particles, and
   a thickness of the low-density layer is 1% or more and 10% or less with respect to the diameter of the secondary particles.

2. The nickel composite hydroxide according to claim 1, wherein, in a particle size distribution measured by a laser diffraction scattering method:
   a volume average particle size (Mv) is 4 micrometers or more and 10 micrometers or less, and
   a particle size distribution width [(D90−D10)/Mv] is 0.60 or less, wherein the particle size distribution width is calculated by a cumulative 90 volume % particle size (D90) and a cumulative 10 volume % particle size (D10), and the volume average particle size (Mv).

3. A method for producing the nickel composite hydroxide according to claim 1, the method comprising:
   a nucleation process for forming a nucleus by adjusting a first mixed aqueous solution containing at least one of a nickel salt, a cobalt salt, and a manganese salt such that a pH will be 12.5 or more on the basis of a liquid temperature of 25° C., in a non-oxidizing atmosphere with an oxygen concentration of less than 5 volume %; and
   a particle growth process for performing a particle growth by adjusting a slurry containing the nucleus formed in the nucleation process such that a pH will be in a range of 10.5 or more and 12.5 or less on the basis of a liquid temperature of 25° C., and also, a pH will be lower than the pH in the nucleation process, wherein the particle growth process comprises:
     a first particle growth process in which a center of the particle of the secondary particles is formed by supplying the first mixed aqueous solution to a mixed aqueous solution obtained in the nucleation process in a non-oxidizing atmosphere with an oxygen concentration of less than 5 volume %,
     a second particle growth process in which the low-density layer is formed by supplying the first mixed aqueous solution to a mixed aqueous solution obtained in the first particle growth process, and by switching to an oxidizing atmosphere with an oxygen concentration of 5 volume % or more,
     a third particle growth process for:
       forming the cobalt rich layer by supplying a second mixed aqueous solution comprising the nickel, the cobalt, the manganese, and optionally the element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=1 and y2=0 or x2/((1−x2−y2−z2)+y2)≥1, and z2 is within a range of 0≤z2≤0.1) to a mixed aqueous solution obtained in the second particle growth process, and by switching to a non-oxidizing atmosphere with an oxygen concentration of less than 5 volume %, or forming the manganese rich layer by supplying a second mixed aqueous solution comprising the nickel, the cobalt, the manganese, and optionally the element M with an atomic ratio of Ni:Co:Mn:M=1−x2−y2−z2:x2:y2:z2 (wherein M is at least one element selected from a group consisting of a transition metal element other than Ni, Co, Mn, a II group element, and a XIII group element, x2 and y2 satisfy x2=0 and y2=1 or y2/((1−x2−y2−z2)+x2)≥1, and z2 is within a range of 0≤z2≤0.1) to a mixed aqueous solution obtained in the second particle growth process, and by switching to a non-oxidizing atmosphere with an oxygen concentration of less than 5 volume %.

4. The method for producing a nickel composite hydroxide according to claim 3, wherein, in the particle growth process, an ammonia adjusted to a concentration of 5 g/L or more and 20 g/L or less is added to the slurry.

5. A positive electrode active material for a lithium ion secondary battery composed of a lithium nickel composite oxide having a hexagonal crystal layered structure, which is composed of secondary particles to which plural primary particles are aggregated, wherein the lithium nickel composite oxide comprises a lithium, a nickel, a cobalt, a manganese, and optionally an element M with an atomic ratio of Li:Ni:Co:Mn:M=1+u:1−x1−y1−z1:x1:y1:z1 (wherein −0.05≤u≤0.50, M is at least one element selected from a group consisting of a transition metal element other than Ni, Co, Mn, a II group element, and a XIII group element, 0.15≤x1≤0.25, 0.15≤y1≤0.25, 0≤z1≤0.1), the lithium nickel composite oxide comprises:
a cobalt rich layer or a manganese rich layer from a surface of a particle of the secondary particles toward an inside of the particle of the secondary particles, and
a low-density layer that is layered between the cobalt rich layer or the manganese rich layer and a center of the particle of the secondary particles, the low-density layer having a lower mass density relative to the remainder of the particle, the cobalt rich layer comprises a lithium, a nickel, a cobalt, a manganese, and optionally an element M with an atomic ratio of Li:Ni:Co:Mn:M=1+u:1−x2−y2−z2:x2:y2:z2 (wherein −0.05≤u≤0.50, M is at least one element selected from a group consisting of a transition metal element other than Ni, Co, Mn, a II group element, and a XIII group element, x2 and y2 satisfy x2=1 and y2=0 or x2/((1−x2−y2−z2)+y2)≥1, and z2 is within a range of 0≤z2≤0.1), the manganese rich layer comprises a lithium, a nickel, a cobalt, a manganese, and optionally an element M with an atomic ratio of Li:Ni:Co:Mn:M=1+u:1−x2−y2−z2:x2:y2:z2 (wherein −0.05≤u≤0.50, M is at least one element selected from a group consisting of a transition metal element other than Ni, Co, Mn, a II group element, and a XIII group element, x2 and y2 satisfy x2=0 and y2=1 or y2/((1−x2−y2−z2)+x2)≥1, and z2 is within a range of 0≤z2≤0.1), a thickness of the cobalt rich layer is 1% or more and 10% or less with respect to a diameter of the secondary particles or a thickness of the manganese rich layer is 1% or more and 10% or less with respect to the diameter of the secondary particles, and a thickness of the low-density layer is 1% or more and 10% or less with respect to the diameter of the secondary particles, and a crystallite diameter calculated from a peak of (003) face by an X-ray diffraction measurement is 100 nm or more and 150 nm or less.

6. The positive electrode active material for a lithium ion secondary battery according to claim 5, wherein, in a particle size distribution measured by a laser diffraction scattering method, a volume average particle size (Mv) is 4 micrometers or more and 10 micrometers or less, and [(D90−D10)/Mv] indicating a particle size distribution width, which is calculated by a cumulative 90 volume % particle size (D90) and a cumulative 10 volume % particle size (D10), and the volume average particle size (Mv), is 0.60 or less.

7. A method for producing a positive electrode active material for a lithium ion secondary battery composed of a lithium nickel composite oxide having a hexagonal crystal layered structure, which is composed of secondary particles to which plural primary particles are aggregated, the method comprising:

a lithium mixing process for forming a lithium mixture by mixing the nickel composite hydroxide according to claim 1 and a lithium compound; and a firing process for firing the lithium mixture in an oxidizing atmosphere at a temperature of 800° C. or more and 950° C. or less.

8. A lithium ion secondary battery comprising a positive electrode at least including the positive electrode active material for the lithium ion secondary battery according to claim 5.

9. A lithium ion secondary battery comprising a positive electrode at least including the positive electrode active material for the lithium ion secondary battery according to claim 6.

10. The nickel composite hydroxide according to claim 1, having the cobalt rich layer.

11. The nickel composite hydroxide according to claim 10, wherein the thickness of the cobalt rich layer is 1% or more and 9.3% or less with respect to the diameter of the secondary particles.

12. The nickel composite hydroxide according to claim 1, having the manganese rich layer.

* * * * *